United States Patent
Kim

(10) Patent No.: US 11,109,401 B2
(45) Date of Patent: Aug. 31, 2021

(54) METHOD AND APPARATUS FOR EFFICIENT PACKET DUPLICATION TRANSMISSION IN MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/444,429

(22) Filed: Jun. 18, 2019

(65) Prior Publication Data
US 2019/0387535 A1 Dec. 19, 2019

(30) Foreign Application Priority Data
Jun. 18, 2018 (KR) .......................... 10-2018-0069672

(51) Int. Cl.
*H04J 3/16* (2006.01)
*H04W 72/12* (2009.01)
(Continued)

(52) U.S. Cl.
CPC ... *H04W 72/1268* (2013.01); *H04W 72/1289* (2013.01); *H04W 84/042* (2013.01); *H04W 88/02* (2013.01)

(58) Field of Classification Search
None
See application file for complete search history.

(56) References Cited

U.S. PATENT DOCUMENTS

| 10,237,784 B2 * | 3/2019 | Loehr | H04W 28/065 |
| 2016/0088127 A1 * | 3/2016 | Cai | H04L 47/283 |
| | | | 370/328 |

(Continued)

FOREIGN PATENT DOCUMENTS

CN 107342851 A 11/2017

OTHER PUBLICATIONS

International Search Report and Written Opinion dated Sep. 24, 2019, issued in an International application No. PCT/KR2019/007316.

(Continued)

*Primary Examiner* — Kwang B Yao
*Assistant Examiner* — Juvena W Loo
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the embodiment of the disclosure, a method of a terminal in a wireless communication system and an apparatus therefor are provided. The method includes receiving a configuration for packet duplication transmission from a base station, transmitting the same packet to the base station through different logical channels according to the configuration, and based on predetermined conditions being satisfied, discarding the previously transmitted packet and synchronizing a packet duplication transmission time.

12 Claims, 25 Drawing Sheets

(51) Int. Cl.
  *H04W 84/04* (2009.01)
  *H04W 88/02* (2009.01)

(56) References Cited

U.S. PATENT DOCUMENTS

| 2018/0279262 | A1* | 9/2018 | Babaei | H04W 72/04 |
| 2018/0317115 | A1* | 11/2018 | Loehr | H04W 72/14 |
| 2018/0324642 | A1* | 11/2018 | Yu | H04W 36/0055 |
| 2018/0368107 | A1* | 12/2018 | Babaei | H04W 76/00 |
| 2018/0368132 | A1* | 12/2018 | Babaei | H04W 72/042 |
| 2019/0098533 | A1* | 3/2019 | Babaei | H04L 1/1854 |
| 2019/0132897 | A1* | 5/2019 | Pradas | G06F 9/45558 |
| 2020/0092746 | A1* | 3/2020 | Baek | H04L 1/08 |
| 2020/0120522 | A1* | 4/2020 | Xiao | H04W 36/28 |
| 2020/0127886 | A1* | 4/2020 | Tang | H04W 76/20 |
| 2020/0205213 | A1* | 6/2020 | Marco | H04W 76/15 |
| 2020/0305158 | A1* | 9/2020 | Shim | H04W 72/0453 |
| 2021/0152296 | A1 | 5/2021 | Chen | |

OTHER PUBLICATIONS

Vivo, 'MAC PDU discard issue for packet duplication', R2-1808666, 3GPP TSG-RAN WG2 Meeting #102, May 11, 2018; Busan, Korea. See sections 1-2.

Huawei et al., 'Remaining PDCP issues for packet duplication', R2-1807491, 3GPP TSG-RAN WG2 Meeting #102, May 11, 2018; Busan, Korea. See sections 1-3, 5.

Huawei et al., 'Discussion on additional PDCP discard timer', R2-1808405, 3GPP TSG-RAN WG2 Meeting #102, May 11, 2018; Busan, Korea. See section 5.4.

Huawei et al., 'Remaining issues on sidelink packet duplication for Mode 4', R2-1807427, 3GPP TSG-RAN WG2 Meeting #102, May 11, 2018; Busan, Korea. See sections 1-3.

Apple: "Synchronization control for PDCP duplication", 3GPP Draft; R2-1808519 Synchronizationcontrol for PDCP Duplication V1, 3rd Generation Partnership Project (3GPP), Mobile Competence Centre; 650, Route Des Lucioles; F-06921 Sophia-Antipolis Cedex, vol. RAN WG2, No. Busan, Korea; May 21, 2018-May 25, 2018 May 20, 2018 (May 20, 2018), XP051444784.

"3rd Generation Partnership Project; Technical Specification Group Radio Access Network; NR; Packet Data Convergence Protocol (PDCP) specification (Release 15)", 3GPP Draft; Draft 38323-F20, 3rd Generation Partnership Project (3GPP), Mobile Competence Centre; 650, Route Des Lucioles; F-06921 Sophia-Antipolis Cedex; France, Jun. 17, 2018 (Jun. 17, 2018), XP051472759.

Huawei et al: "Solutions for SN gap issue due to PDCP discard". 3GPP Draft; R2-1710781 Solutions for SN Gap Issue Due To PDCP Discard. 3rd Generation Partnership Project (3GPP). Mobile Competence Centre; 650. Route DesLucioles; F-06921 Sophia-Antipolis Cedex vol. RAN WG2. No. Prague. Czech Republic; Oct. 9, 2017-Oct. 13, 2017 Oct. 8, 2017 (Oct. 8, 2017), XP051342807.

Extended European Search Report dated Mar. 9, 2021, issued in European Application No. 19823725.7-1213.

* cited by examiner

METHOD AND APPARATUS FOR EFFICIENT PACKET DUPLICATION TRANSMISSION IN MOBILE COMMUNICATION SYSTEM

CROSS-REFERENCE TO RELATED APPLICATION(S)

This application is based on and claims priority under 35 U.S.C. § 119 of a Korean patent application number 10-2018-0069672, filed on Jun. 18, 2018, in the Korean Intellectual Property Office, the disclosure of which is incorporated by reference herein in its entirety.

BACKGROUND

1. Field

The disclosure relates to a mobile communication system. More particularly, the disclosure relates to a method and an apparatus for supporting efficient packet duplication transmission in a next-generation mobile communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The next-generation mobile communication system may support a low transmission delay and may ensure high reliability through packet duplication transmission. However, there is a problem that transmission resources are wasted, and a method for solving the problem is needed.

The above information is presented as background information only to assist with an understanding of the disclosure. No determination has been made, and no assertion is made, as to whether any of the above might be applicable as prior art with regard to the disclosure.

SUMMARY

In the next-generation mobile communication system, packet duplication transmission may be applied to the uplink and downlink in order to support a lower transmission delay and in order to guarantee higher reliability. However, since the same packet is transmitted in duplicate in the packet duplication transmission, transmission resources may be wasted, and data must be processed in duplicate.

Aspects of the disclosure are to address at least the above-mentioned problems and/or disadvantages and to provide at least the advantages described below. Accordingly, an aspect of the disclosure is to provide a processing method of a transmitter for efficiently performing packet duplication transmission and a method in which a base station applies the packet duplication transmission to efficiently provide a terminal with a low transmission delay and high reliability.

Additional aspects will be set forth in part in the description which follows and, in part, will be apparent from the description, or may be learned by practice of the presented embodiments.

In accordance with an aspect of the disclosure, a method of a terminal in the disclosure is provided. The method includes receiving a configuration for packet duplication transmission from a base station, transmitting the same packet to the base station through different logical channels according to the configuration, and based on predetermined conditions being satisfied, discarding the previously transmitted packet and synchronizing a packet duplication transmission time.

In accordance with another aspect of the disclosure, a terminal of the display is provided. The terminal includes a transceiver. and at least one processor coupled with the transceiver. The at least one processor is configured to receive a configuration for packet duplication transmission from a base station, configured to transmit the same packet to the base station through different logical channels according to the configuration, and configured to discard the previously transmitted packet and synchronize a packet duplication transmission time based on predetermined conditions being satisfied.

Embodiments of the disclosure propose packet duplication processing methods of a transmitter for efficiently performing packet duplication transmission in a next-generation mobile communication system, thereby preventing waste of transmission resources and preventing unnecessary data processing. In addition, the base station is able to improve a data rate, and is able to transmit control information with a low transmission delay and high reliability to the terminal by applying packet duplication transmission.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

The terms for identifying access nodes, the terms referring to network entities, the terms referring to messages, the terms referring to interfaces between network entities, the terms referring to a variety of identification information, and the like, which are used herein, are only examples provided for the convenience of explanation. Therefore, the disclosure is not limited to the terms mentioned below, and other terms referring to the objects having equivalent technical meanings may be used.

Hereinafter, the disclosure will be described using the terms and names defined in the 3rd generation partnership project long-term evolution (3GPP LTE) standard for the convenience of explanation. However, the disclosure is not limited to the above terms and names, and may be equally applied to systems conforming to other standards. In the disclosure, evolved node B (eNB) may be used interchangeably with gNB for the convenience of explanation. That is, the base station described as an eNB may represent a gNB. In addition, the term "terminals" may denote other wireless communication devices, as well as cellular phones, NB-Internet of Things (IoT) devices, and sensors.

Figure 1:
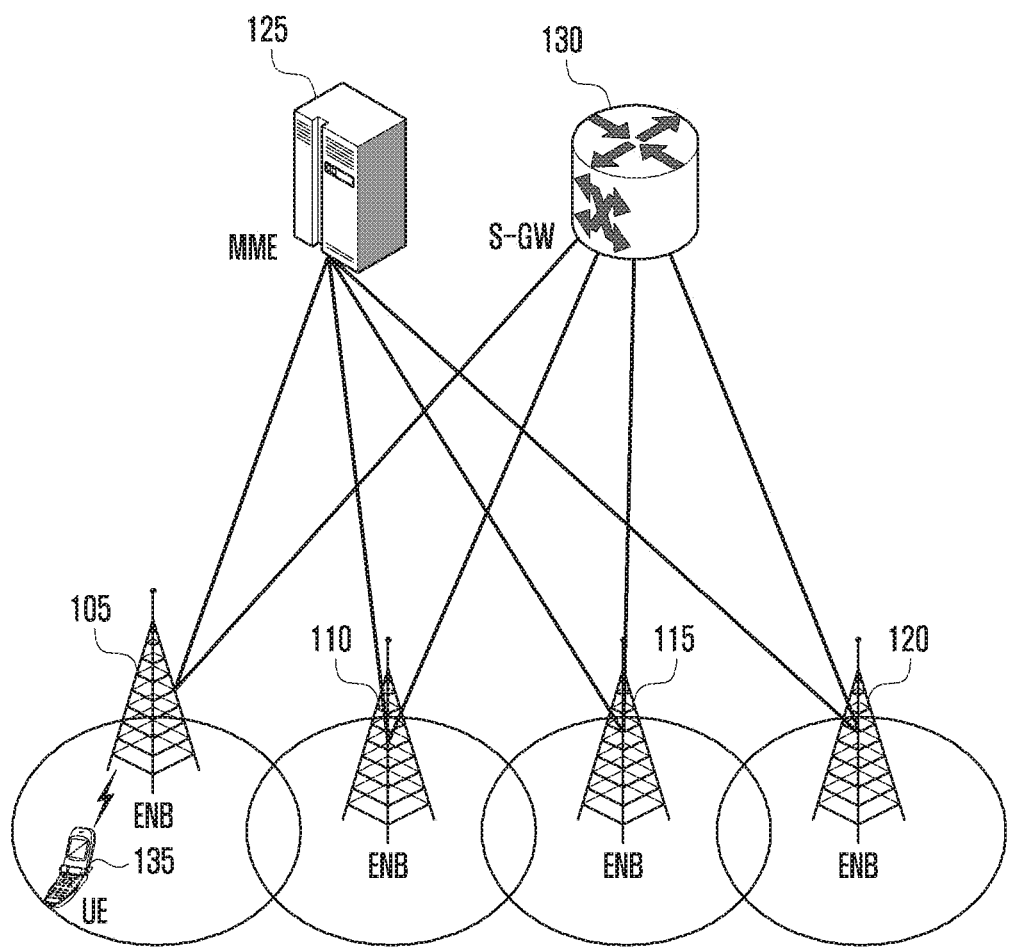
FIG. 1 is a diagram illustrating the structure of a long-term evolution (LTE) system according to an embodiment of the disclosure.

FIG. 1 is a diagram showing the structure of an LTE system according to an embodiment of the disclosure.

Referring to FIG. 1, the wireless access network of the LTE system includes evolved node Bs (hereinafter, referred to as "ENBs", "Node Bs", or "base stations") 105, 110, 115, and 120, a mobility management entity (MME) 125, and a serving gateway (S-GW) 130 as shown in the drawing. User equipment (hereinafter, referred to as "UE" or a "terminal") 135 accesses an external network through the ENBs 105 to 120 and the S-GW 130.

In FIG. 1, the ENBs 105 to 120 correspond to existing node Bs of a UMTS system. The ENB is connected to the UE 135 via a wireless channel and plays a more complex role than the existing node B. In the LTE system, since all user traffic including real-time services, such as voice-over-IP (VoIP) through the Internet protocol, is served through a shared channel, a device for collecting status information, such as buffer status, available transmission power status, and channel status of UEs, and performing scheduling is required, and the ENBs 105 to 120 serve as such a device. One ENB typically controls multiple cells.

For example, in order to realize a data rate of 100 Mbps, the LTE system uses, as wireless access technology, orthogonal frequency division multiplexing (hereinafter, referred to as "OFDM") in a bandwidth of, for example, 20 MHz. Further, an adaptive modulation and coding (hereinafter, referred to as "AMC") scheme is applied to determine a modulation scheme and a channel coding rate in accordance with the channel status of a terminal.

The S-GW 130 is a device for providing data bearers, and generates or removes data bearers under the control of the MME 125.

The MME is a device that performs various control functions, as well as a mobility management function for a terminal, and is connected to a plurality of base stations.

Figure 2:
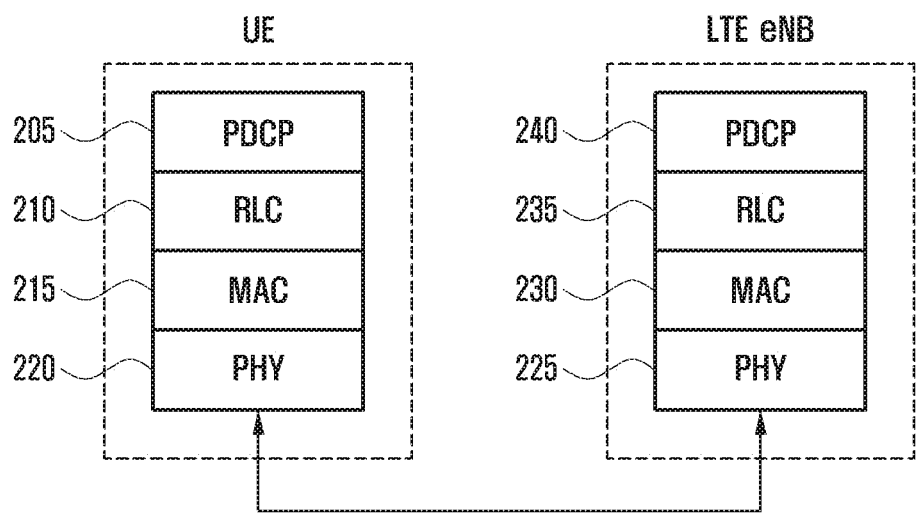
FIG. 2 is a diagram illustrating a wireless protocol structure in an LTE system according to an embodiment of the disclosure.

FIG. 2 is a diagram illustrating a wireless protocol structure in an LTE system according to an embodiment of the disclosure.

Referring to FIG. 2, the wireless protocol of the LTE system includes a packet data convergence protocol (PDCP) 205 or 240, a radio link control (RLC) 210 or 235, and a medium access control (MAC) 215 or 230 in a terminal and an ENB, respectively.

The PDCP 205 or 240 performs operations such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC 210 or 235 reconfigures a PDCP PDU (packet data unit) to an appropriate size and performs an automatic repeat request (ARQ) operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 215 or 230 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from physical layers on transport channels Scheduling information reporting Hybrid Automatic Repeat Request (HARQ) function (error correction through HARQ)

Priority handling between logical channels of one UE

Priority handling between UEs by means of dynamic scheduling

Multimedia Broadcast Multicast Services (MBMS) service identification

Transport format selection

Padding

The physical layer 220 or 225 channel-codes and modulates upper layer data, and converts the same into OFDM symbols to then be transmitted through a wireless channel, or demodulates OFDM symbols received through a wireless channel and channel-decodes the same to then be transmitted to upper layers.

Figure 3:
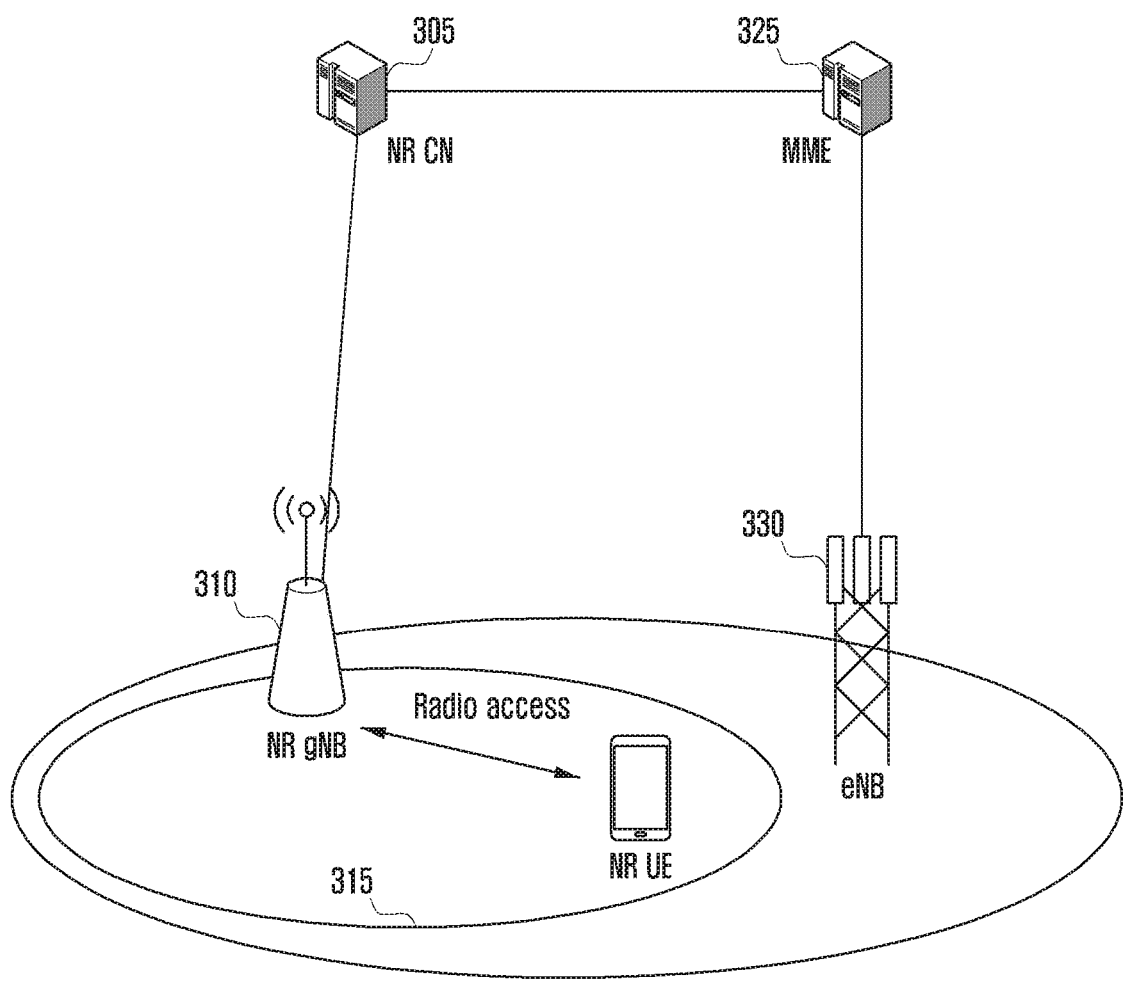
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

Referring to FIG. 3, a wireless access network of a next-generation mobile communication system (hereinafter, referred to as "NR" or "5 g") includes a new radio node B (hereinafter, referred to as "NR gNB" or an "NR base station") 310 and a new radio core network (NR CN) 305 as shown in the drawing. New radio user equipment (hereinafter, referred to as "NR UE" or a "terminal") 315 accesses an external network through the NR gNB 310 and the NR CN 305.

In FIG. 3, the NR gNB 310 corresponds to an evolved node B (eNB) of an existing LTE system. The NR gNB is connected to the NR UE 315 through a wireless channel, and may provide services superior to those of the existing node B.

In the next-generation mobile communication system, since all user traffic is served through a shared channel, a device for collecting status information, such as buffer status, available transmission power status, and channel status of UEs, and performing scheduling is required, and the NR gNB 310 serves as such a device. One NR gNB typically controls multiple cells.

In order to realize super-high data rates compared to the existing LTE system, the next-generation mobile communication system may have a bandwidth equal to or greater than the maximum bandwidth of the existing system, may employ, as wireless access technology, an OFDM scheme, and may further employ a beamforming technique in addition thereto. In addition, an AMC scheme is applied to determine a modulation scheme and a channel coding rate in accordance with the channel status of a terminal.

The NR CN 305 performs functions such as mobility support, bearer configuration, and quality-of-service (QoS) configuration. The NR CN is a device that performs various control functions, as well as a mobility management function of a terminal, and is connected to a plurality of base stations. In addition, the next-generation mobile communication system may interwork with an existing LTE system, and the NR CN is connected to an MME 325 through a network interface. The MME is connected to an eNB 330, which is an existing base station.

Figure 4:
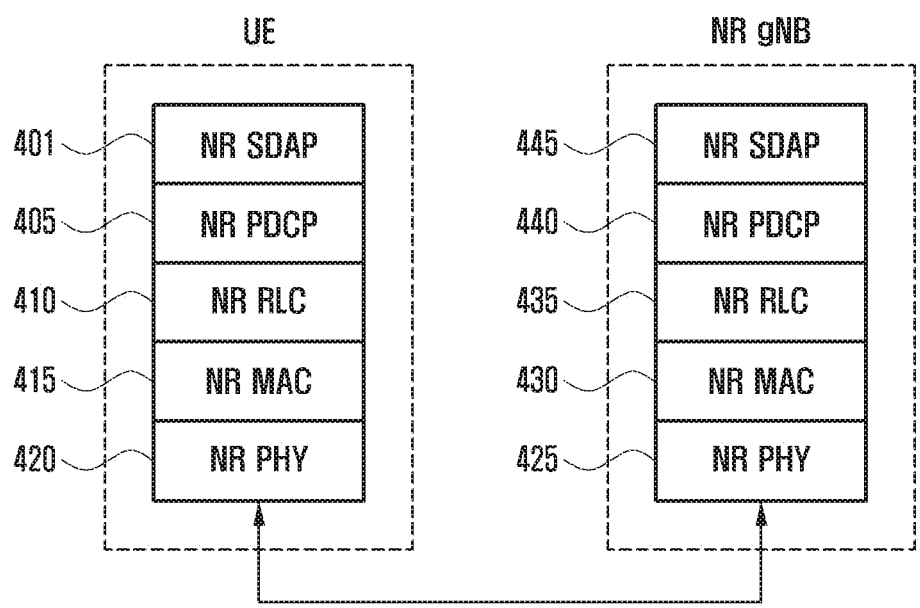
FIG. 4 is a diagram illustrating a wireless protocol structure of a next-generation mobile communication system according to an embodiment of the disclosure.

FIG. 4 is a diagram illustrating a wireless protocol structure of a next-generation mobile communication system according to an embodiment of the disclosure.

Referring to FIG. 4, the wireless protocol of the next-generation mobile communication system includes an NR service data adaption protocol (SDAP) 401 or 445, an NR PDCP 405 or 440, NR RLC 410 or 435, and NR MAC 415 or 430 in the terminal and the NR base station, respectively.

The primary functions of the NR SDAP 401 or 445 may include some of the following functions.

Transfer of user plane data

Mapping between QoS flow and DRB for both DL and UL

Marking QoS flow ID in both DL and UL packets

Mapping reflective QoS flow with DRB for UL SDAP PDUs

For the SDAP entity, the terminal may be configured whether or not to use a header of the SDAP entity or whether or not to use functions of the SDAP entity for each PDCP entity (or PDCP layer), for each bearer, or for each logical channel through an RRC message. In the case where an SDAP header is configured, a 1-bit NAS reflective QoS indicator and a 1-bit AS reflective QoS indicator of the SDAP header may instruct the terminal to update or reconfigure mapping information about the QoS flow and data bearers in the uplink and downlink. The SDAP header may include QoS flow ID information indicating the QoS. The QoS information may be used as data-processing priority, scheduling information, and the like in order to support effective services.

The primary functions of the NR PDCP 405 or 440 may include some of the following functions.

Header compression and decompression (ROHC only)

Transfer of user data

In-sequence delivery of upper layer PDUs

Out-of-sequence delivery of upper layer PDUs

Sequence reordering (PDCP PDU reordering for reception)

Duplicate detection of lower layer SDUs

Retransmission of PDCP SDUs

Ciphering and deciphering

Timer-based SDU discard in uplink

The reordering function of the NR PDCP entity refers to a function of reordering PDCP PDUs received in a lower layer based on a PDCP sequence number (SN), may include a function of transmitting data to an upper layer in the reordered order, may include a function of directly transmitting data without considering the order, may include a function of reordering the sequence and recording lost PDCP PDUs, may include a function of sending a status report of the lost PDCP PDUs to the transmitter, or may include a function of making a request for retransmission of the lost PDCP PDUs.

The primary functions of the NR RLC 410 or 435 may include some of the following functions.

Data transfer function (transfer of upper layer PDUs)

In-sequence delivery of upper layer PDUs

Out-of-sequence delivery of upper layer PDUs

ARQ function (error correction through ARQ)

Concatenation, segmentation, and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC entity refers to a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs based on an RLC SN or a PDCP SN, may include a function of reordering the sequence and recording lost RLC PDUs, may include a function of sending a status report of the lost RLC PDUs to the transmitter, may include a function of making a request for retransmission of the lost RLC PDUs, may include a function of, if there is a lost RLC SDU, transmitting only the RLC SDUs prior to the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival regardless of the sequence number), and may be transmitted to the PDCP entity in an out-of-sequence delivery mariner. In the case of segments, the segments, which are stored in a buffer or will be received later, may be received and reconfigured into one complete RLC PDU, and then the RLC PDU may be processed and transmitted to the PDCP entity.

The NR RLC entity may not include a concatenation function, which may be performed in the NR MAC entity or may be replaced with a multiplexing function of the NR MAC entity.

The out-of-sequence delivery of the NR RLC entity refers to a function of directly delivering RLC SDUs received from a lower layer to an upper layer regardless of sequence, may include a function of, if one original RLC SDU is divided into a plurality of RLC SDUs and is received, reassembling and delivering the same, and may include a function of storing and ordering RLC SNs or PDCP SNs of the received RLC PDUs, thereby reordering sequence and recording the lost RLC PDUs.

The NR MAC 415 or 430 may be connected to a plurality of NR RLC entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 420 and 425 may perform operations of channel-coding and modulating upper layer data into OFDM symbols, transmitting the same through a wireless channel, or operations of demodulating and channel-decoding OFDM symbols received through the wireless channel and transmitting the same to the upper layer.

Figure 5:
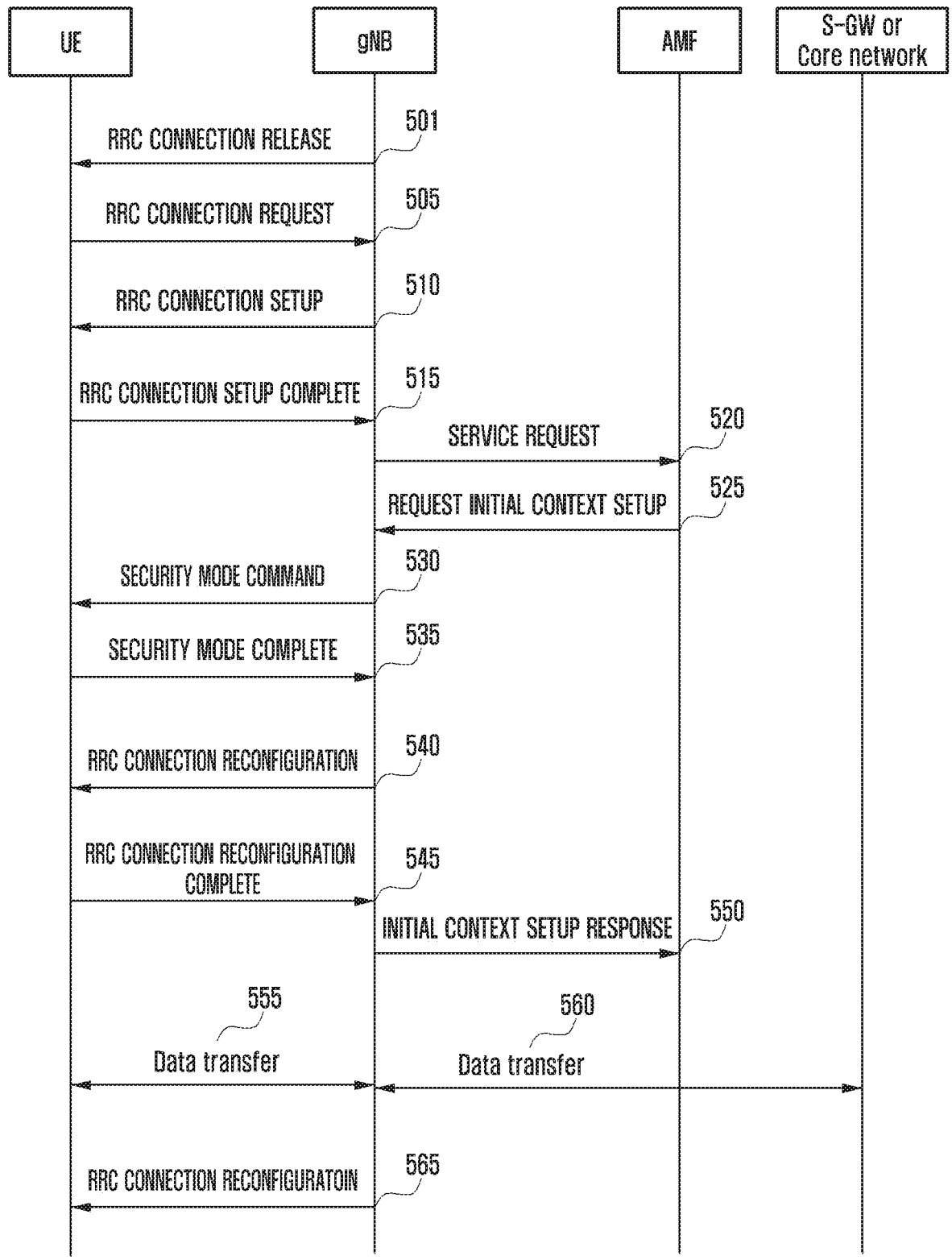
FIG. 5 is a diagram illustrating a procedure in which a terminal of the disclosure establishes a radio resource control (RRC) connection with a base station through a network in a next-generation mobile communication system according to an embodiment of the disclosure.

FIG. 5 is a diagram illustrating a procedure in which a terminal of the disclosure establishes an RRC connection with a base station through a network in a next-generation mobile communication system according to an embodiment of the disclosure.

In FIG. 5, if the terminal transmitting and receiving data in an RRC connection mode does not transmit or receive data for predetermined reasons or for a predetermined period of time, the base station may transmit an RRC-connection-release message to the terminal such that the terminal switches to an RRC idle mode (501).

Thereafter, if there is data to be transmitted, the terminal that is currently in the idle mode (hereinafter, referred to as an "idle mode UE") performs an RRC connection establishment process with the base station. The terminal establishes reverse transmission synchronization with the base station through a random access process, and transmits an RRC-connection-request message to the base station (505). The message contains an identifier of the terminal, the reason for establishment, and the like.

The base station transmits an RRC-connection-setup message such that the terminal establishes an RRC connection (510). The RRC-connection-setup message may contain configuration information for each logical channel, configuration information for each bearer, configuration information of a PDCP entity, configuration information of an RLC entity, or configuration information of a MAC entity. In addition, the base station may configure configuration information of a PDCP entity, bearer identifiers, logical channel identifiers, mapping information between the logical channels and the cells (frequencies), cell group configuration information, a threshold value to be used for dual-connectivity, and the like through the message, thereby configuring dual-connectivity and carrier aggregation to the terminal. In addition, the base station may configure two RLC entities in the PDCP entity configuration information to the terminal for uplink and downlink packet duplication transmission through the message, in which a primary RLC entity (or first RLC entity) and a secondary RLC entity (or second RLC entity) may be configured through logical channel identifiers or indicators. The packet duplication transmission may be used in carrier aggregation or dual-connectivity.

In addition, the base station may configure the initial state of a bearer {e.g., a signaling radio bearer (SRB) or a data radio bearer (DRB)}, which is configured with packet duplication transmission through the message, to be in an active state or inactive state. Further, mapping information between QoS flows and bearers may be configured through the SDAP entity configuration information or the PDCP entity configuration information included in the message, and the SDAP entity may transmit the data received from an upper entity to the PDCP entity configured by the mapping using the mapping information. The message contains RRC connection configuration information and the like. The RRC connection is also called an "SRB", and is used for transmission and reception of RRC messages, which are control messages, between the terminal and the base station.

The terminal, which has established the RRC connection, transmits an RRC-connection-setup-complete message to the base station (515). The RRC-connection-setup-complete message includes a control message of a "service request" by which the terminal makes a request for configuration of bearers for predetermined services to an access management function (AMF) or an MME.

The base station transmits a service request message included the RRC-connection-setup-complete message to the AMF or the MME (520), and the AMF or the MME determines whether or not to provide the services requested by the terminal. If the AMF or the MME determines to provide the services requested by the terminal as a result of the determination, the AMF or MME transmits an initial-context-setup-request message to the base station (525). The message includes QoS information to be applied when configuring a DRB, security-related information to be applied to the DRB (e.g., security keys or security algorithms), and the like.

The base station transmits a security-mode-command message for configuration of security with respect to the terminal (530), and receives a security-mode-complete message therefrom (535).

If the security configuration is completed, the base station transmits an RRC-connection-reconfiguration message to the terminal (540). The message may include configuration information for each logical channel, configuration information for each bearer, configuration information of a PDCP entity, configuration information of an RLC entity, or configuration information of a MAC entity. In addition, the base station may configure configuration information of a PDCP entity, bearer identifiers, logical channel identifiers, mapping information between the logical channels and the cells (frequencies), cell group configuration information, a threshold value to be used for dual-connectivity, and the like through the message, thereby configuring dual-connectivity and carrier aggregation to the terminal. In addition, the base station may configure two RLC entities in the PDCP entity configuration information to the terminal for uplink and downlink packet duplication transmission through the message, in which a primary RLC entity and a secondary RLC entity may be configured through logical channel identifiers or indicators. The packet duplication transmission may be used in carrier aggregation or dual-connectivity.

In addition, the base station may configure the initial state of a bearer (e.g., an SRB or a DRB), which is configured with the packet duplication transmission through the message, to be in an active state or inactive state. Further, mapping information between QoS flows and bearers may be configured through the SDAP entity configuration information or the PDCP entity configuration information included in the message, and the SDAP entity may transmit the data received from an upper entity to the PDCP entity configured by the mapping using the mapping information.

In addition, the message includes configuration information of a DRB for processing user data, and the terminal configures a DRB by applying the information and transmits an RRC-connection-reconfiguration-complete message to the base station (545).

The base station, which has completed the DRB configuration with the terminal, may transmit an initial-context-setup-complete message to the AMF or the MME, and may complete the connection (550).

If the above process is completed, the terminal transmits and receives data to and from the base station through a core network (555 and 560).

As described above, a general data transmission process includes three stages, such as RRC connection configuration, security configuration, and DRB configuration. In addition, the base station may transmit an RRC-connection-reconfiguration message to the terminal for predetermined reasons to refresh, add, or change the configuration (565). The message may include configuration information for each logical channel, configuration information for each bearer, configuration information of a PDCP entity, configuration information of an RLC entity, or configuration information of a MAC entity. In addition, the base station may configure configuration information of a PDCP entity, bearer identifiers, logical channel identifiers, mapping information between the logical channels and the cells (frequencies), cell group configuration information, a threshold value to be used for dual-connectivity, and the like through the message, thereby configuring dual-connectivity and carrier aggregation to the terminal.

In addition, the base station may configure two RLC entities in the PDCP entity configuration information to the terminal for uplink and downlink packet duplication transmission through the message, in which a primary RLC entity and a secondary RLC entity may be configured through logical channel identifiers or indicators. The packet duplication transmission may be used in carrier aggregation or dual-connectivity.

Further, the base station may configure the initial state of a bearer (e.g., an SRB or a DRB), which is configured with packet duplication transmission through the message, to be in an active state or inactive state. Further, mapping information between QoS flows and bearers may be configured through the SDAP entity configuration information or the PDCP entity configuration information included in the message, and the SDAP entity may transmit the data received from an upper entity to the PDCP entity configured by the mapping using the mapping information.

Figure 6:
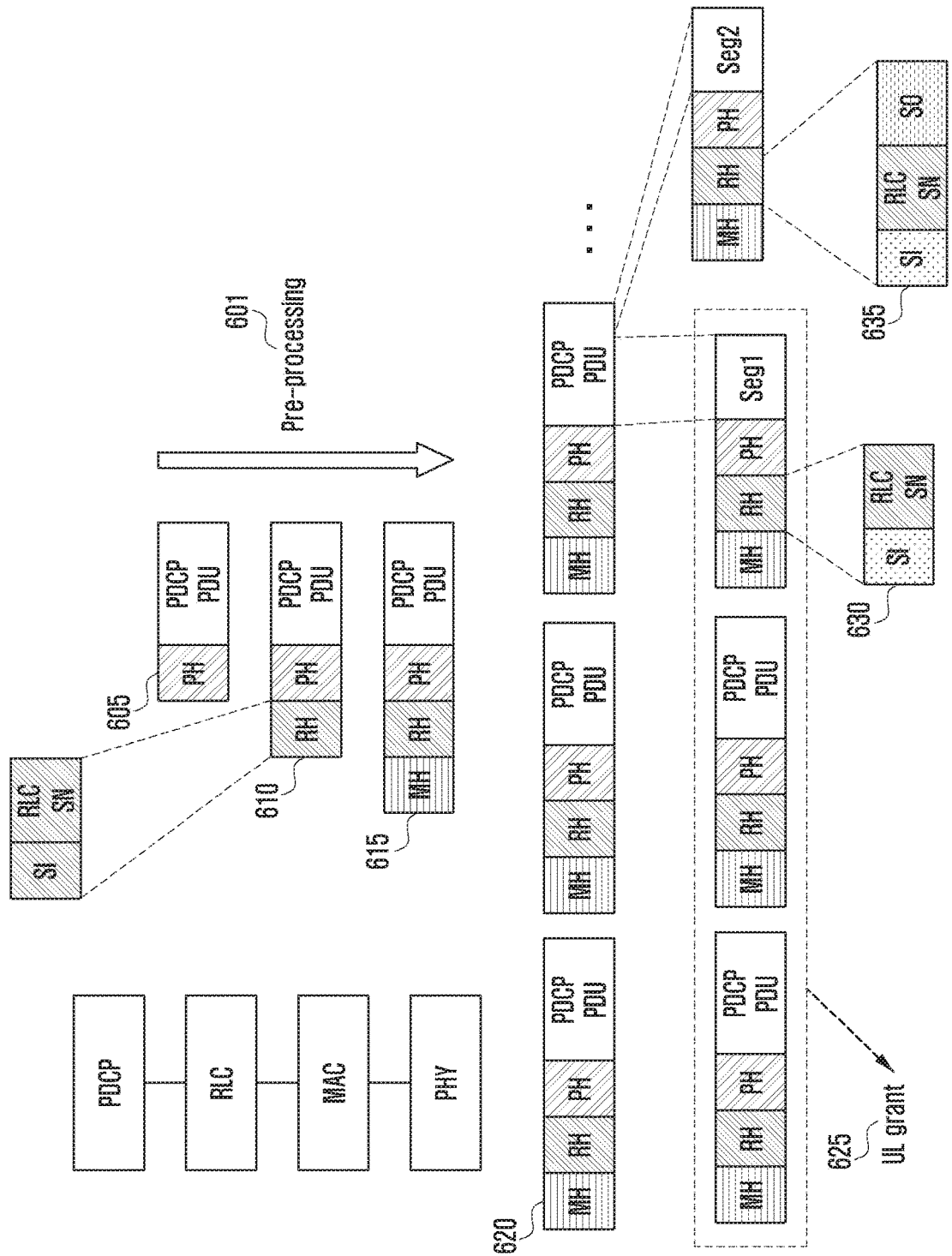
FIG. 6 is a diagram illustrating a procedure of performing data-preprocessing in a next-generation mobile communication system according to an embodiment of the disclosure.

FIG. 6 is a diagram illustrating a procedure of performing data-preprocessing in a next-generation mobile communication system according to an embodiment of the disclosure.

FIG. 6 shows a procedure for performing data-preprocessing 601. The data-preprocessing means that an SDAP entity, a PDCP entity, an RLC entity, or a MAC entity processes data in advance before receiving uplink transmission resources.

The preprocessing of data may mean that a header of each entity is configured or functions of each entity are performed. For example, if an SDAP entity is configured, the SDAP entity may configure an SDAP header for the data received from an upper layer, and may transmit the data to the PDCP entity corresponding to a mapped bearer in the QoS flow of the data. In the case where robust header compression (ROHC) is configured, the PDCP entity may perform header compression on the upper layer headers of the PDCP SDUs excluding the SDAP header of the data, and in the case where integrity protection is configured, the PDCP entity may generate a PDCP header, may perform integrity protection in consideration of the same, may perform ciphering on the PDCP SDU, may concatenate the PDCP header 605 allocated with a PDCP sequence number, and may transmit data to a lower RLC entity.

Then, the RLC entity may configure a segmentation information (SI) field, may allocate an RLC sequence number to form an RLC header 610, and may concatenate the RLC header, thereby transmitting the same to a lower MAC entity. The MAC entity may configure an L field of the MAC header and a logical channel identifier, and may concatenate the MAC header 615, thereby preconfiguring data (620).

In a data-preprocessing procedure according to another method, the PDCP entity may perform header compression, integrity verification, and a ciphering process, thereby separately generating a PDCP header, an RLC header, and a MAC header. That is, the headers may be generated in advance without transmitting data to the RLC entity or the MAC entity, and it is possible to update headers and to concatenate headers with data to thus configure a single MAC PDU upon receiving the uplink transmission resources.

Upon receiving the uplink transmission resources (625), the terminal may perform insertion of the preprocessed data so as to conform to the uplink transmission resources, thereby configuring data (a MAC PDU) to be transmitted. If the uplink transmission resources are insufficient, the terminal may perform a segmentation process for the last data to be included in the MAC PDU, and may update the SI field of the RLC header, and if it is not the first segment, an SO field may be added (630 and 635). The terminal may update an L field value of the MAC header for the reduced length due to the segmentation to thus configure a MAC PDU conforming to the size of the uplink transmission resource, and may deliver the same to a lower PHY entity for transmission.

Figure 7:
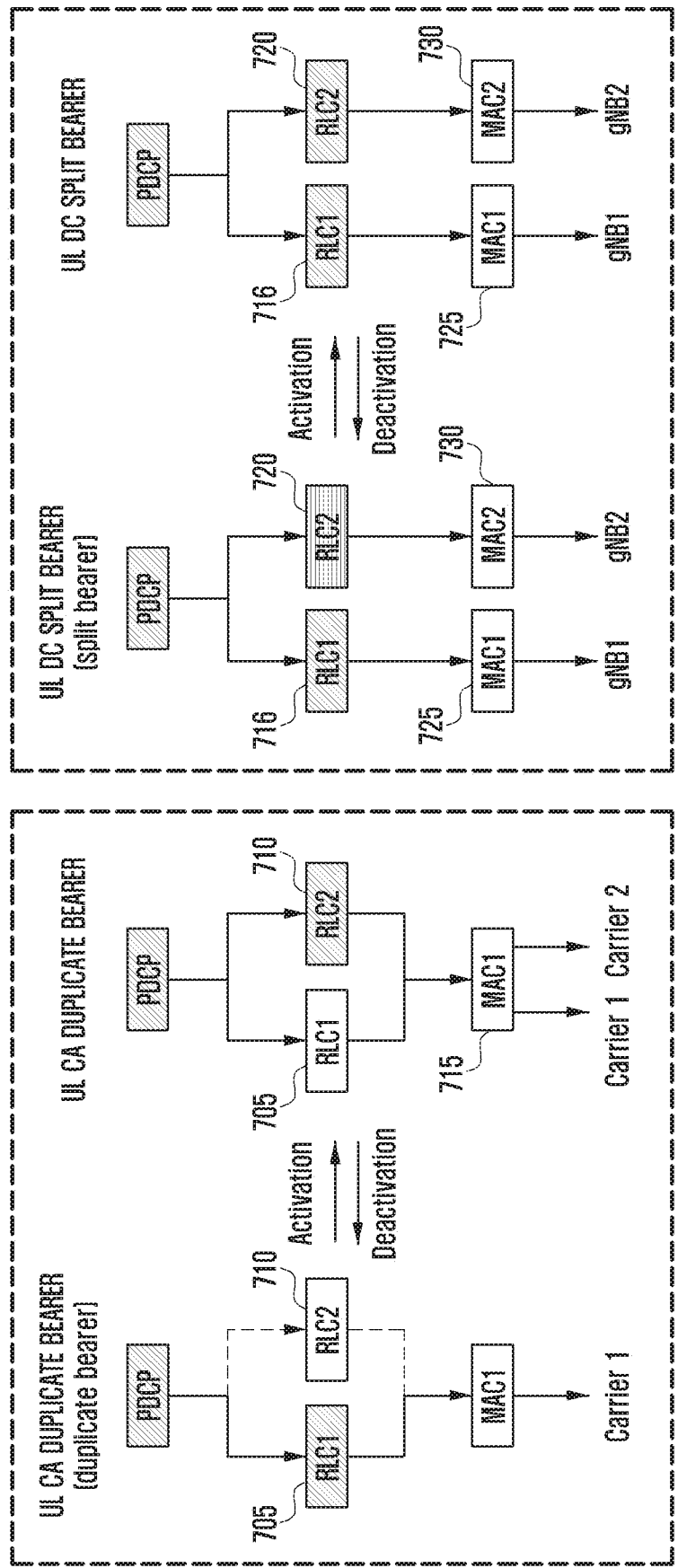
FIG. 7 is a diagram illustrating a procedure in which packet duplication transmission is configured and performed in an active state and an inactive state in a next-generation mobile communication system according to an embodiment of the disclosure.

FIG. 7 is a diagram illustrating a procedure in which packet duplication transmission is configured and performed in an active state and an inactive state in a next-generation mobile communication system according to an embodiment of the disclosure.

If a configuration for packet duplication transmission is received from the base station through an RRC message as described in FIG. 5, the terminal may perform packet duplication transmission.

If the packet duplication transmission is configured in carrier aggregation, two RLC entities (i.e., a primary RLC entity 705 and a secondary RLC entity 710) may be configured for a bearer or a PDCP entity configured with the packet duplication transmission.

If the packet duplication transmission is deactivated, the PDCP entity transmits a packet only to the primary RLC entity 705, and does not transmit a packet to the secondary RLC entity in the uplink transmission.

If the packet duplication transmission is activated, the PDCP entity may transmit the same packet to two lower RLC entities (the primary RLC entity and the secondary RLC entity) in duplicate, respectively, in the uplink transmission. That is, the PDCP entity may transmit one packet to the primary RLC entity, and may duplicate the packet to thus transmit the same packet to the secondary RLC entity.

If the packet duplication transmission is configured and is activated in carrier aggregation, the MAC entity 715 may transmit the data received from the primary RLC entity and the secondary RLC entity, which have different logical channel identifiers as each other, through different carriers.

The above procedure relates to uplink data transmission, and for the downlink data reception, the terminal must be always able to receive downlink data to which packet duplication transmission is applied. Although it is impossible to transmit uplink data to the secondary RLC entity in duplicate due to the deactivation of the packet duplication transmission, the secondary RLC entity 710 must be able to receive and process downlink data from the MAC entity to then transmit the same to the PDCP entity.

That is, if the packet duplication transmission is configured and activated in carrier aggregation, the terminal may transmit the uplink data in the PDCP entity to the primary RLC entity and the secondary RLC entity in duplicate, whereas if the packet duplication transmission is configured and deactivated in carrier aggregation, the terminal may transmit the data only to the primary RLC entity, instead of performing the duplication transmission of uplink data in the PDCP entity. The configuration of the activation and deactivation state of the packet duplication transmission may be determined by a MAC control element (MAC CE).

If the packet duplication transmission is configured in dual-connectivity, two RLC entities (i.e., a primary RLC entity 716 and a secondary RLC entity 720) may be configured for a bearer or a PDCP entity configured with the packet duplication transmission.

If the packet duplication transmission is deactivated, the PDCP entity may transmit different data to the primary RLC entity and the secondary RLC entity, respectively, in the uplink transmission, as the operation of a split bearer, instead of transmitting the same data in duplicate.

If the packet duplication transmission is activated, the PDCP entity may transmit the same packet to two lower RLC entities (the primary RLC entity and the secondary RLC entity, respectively) in duplicate in the uplink transmission. That is, the PDCP entity may transmit one packet to the primary RLC entity, and may duplicate the packet to thus transmit the same packet to the secondary RLC entity.

If the packet duplication transmission is configured and activated in dual-connectivity, respective MAC entities 725 and 730 may transmit the data received from the respective RLC entities to different base stations.

The above procedure relates to uplink data transmission, and for the downlink data reception, the terminal must be always able to receive downlink data to which packet duplication transmission is applied.

That is, if the packet duplication transmission is configured and activated in dual-connectivity, the terminal may transmit the uplink data in the PDCP entity to the primary RLC entity and the secondary RLC entity in duplicate, whereas if the packet duplication transmission is configured and deactivated in dual-connectivity, the terminal may transmit different data to the primary RLC entity and the secondary RLC entity, like operation of a split bearer, instead performing the duplication transmission of uplink data in the PDCP entity. The configuration of the activation and deactivation state of the packet duplication transmission may be determined by a MAC control element.

Efficient data-processing methods in packet duplication transmission proposed in the disclosure below may be applied both to the case where the packet duplication transmission is used for carrier aggregation and to the case where the packet duplication transmission is used for dual-connectivity.

Figure 8:
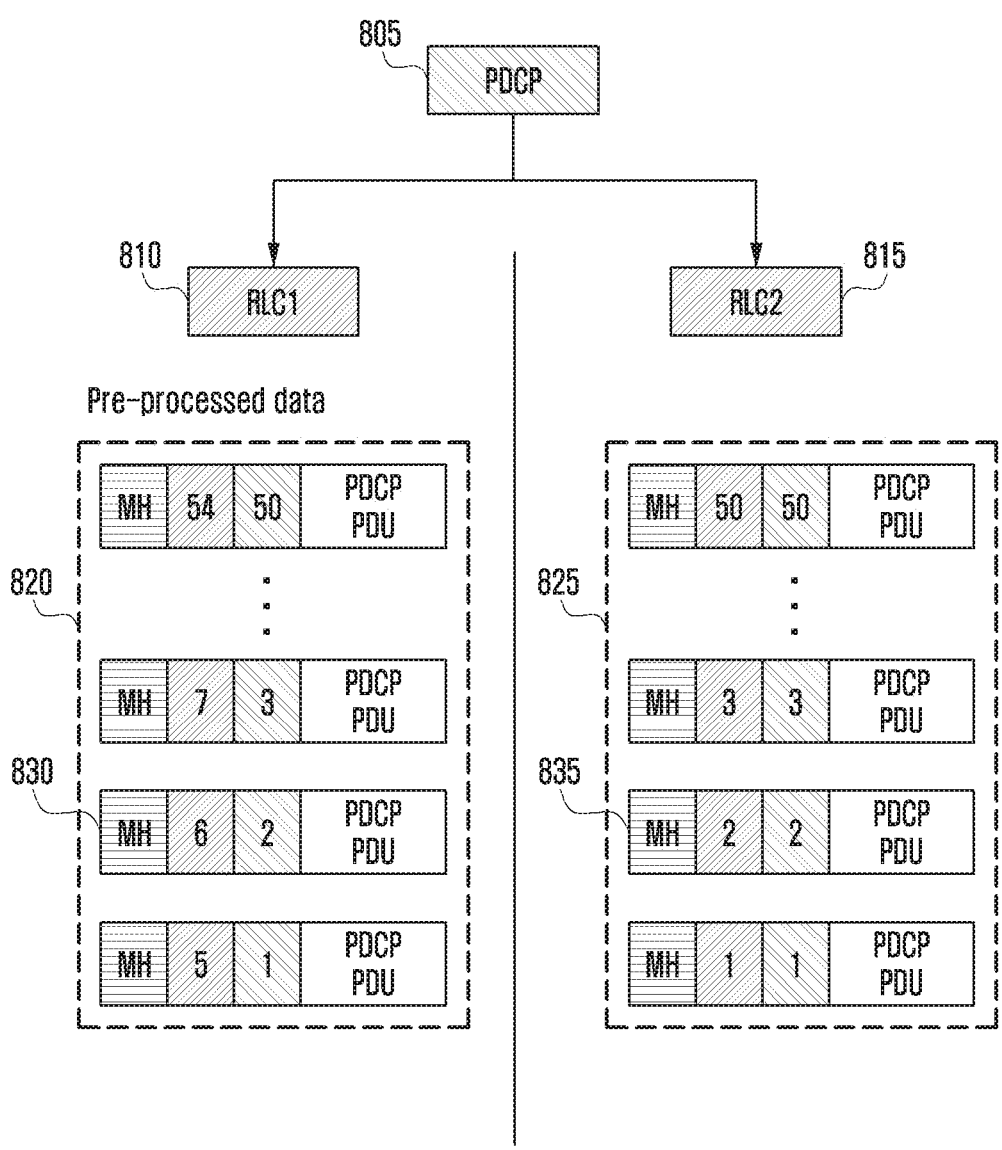
FIG. 8 is a diagram illustrating a method of performing data-preprocessing in the case of applying packet duplication transmission according to an embodiment of the disclosure.

FIG. 8 is a diagram illustrating a method of performing data-preprocessing in the case of applying packet duplication transmission according to an embodiment of the disclosure.

If packet duplication transmission is configured, the PDCP entity 805 of a transmitter (a base station or a terminal) may process received data in duplicate, and may perform data-preprocessing in each RLC entity and MAC entity (820 and 825). That is, the PDCP entity may assign PDCP sequence numbers to respective pieces of data, and each RLC entity may assign each RLC sequence number. The RLC sequence numbers used in the primary RLC entity and the secondary RLC entity may be different from each other, and the respective RLC entities assign respective RLC sequence numbers independently. For example, if the data corresponding to PDCP sequence numbers 1 to 50 is duplicated and transmitted to the primary RLC entity 810 and the secondary RLC entity 815, the primary RLC entity may assign first RLC sequence numbers 5 to 54 to the 51 pieces of data, and the secondary RLC entity may assign second RLC sequence numbers 1 to 50 to the 51 pieces of data. Then, headers of the respective entities are configured, thereby completing the data-preprocessing.

In the packet duplication transmission, data is transmitted through different paths such that even one piece of data arrives first despite duplicate reception of data in the receiver, thereby reducing a transmission delay and improving reliability, while causing a problem of wasting transmission resources.

However, in the case of an RLC AM (acknowledged mode) bearer, since the RLC entity performs an ARQ function, it is possible to receive ACK/NACK information for the data, which is successfully transmitted or fails to be transmitted, through an RLC status PDU. Therefore, the transmitter does not need to continuously transmit the data, which was successfully transmitted in one RLC entity, in the other RLC entity. For example, if the primary RLC entity receives an RLC status report (an RLC status PDU) indicating that the data of PDCP sequence number 2 (first RLC sequence number 6) 830 has been successfully transmitted, the secondary RLC entity no longer needs to transmit the data of PDCP sequence number 2 (second RLC sequence number 2) 835. This is due to the fact that data transmission by the secondary RLC entity may be detected as duplication in the PDCP entity of a receiver (a terminal or a base station) because the receiver has already received the data of PDCP sequence number 2, thereby discarding the duplicate data.

However, even if the secondary RLC entity is aware of the successful transmission of the data of PDCP sequence number 2 through the primary RLC entity by means of an indication of the PDCP entity, if the data has already been transmitted, or if a segment of the data has already been transmitted, the secondary RLC entity cannot discard the data for retransmission of the data. That is, retransmission must be performed so as to avoid a problem of an RLC sequence number gap in the receiver.

If the RLC AM bearer receives an RLC status report indicating the successful transmission of a packet in one RLC entity using the ARQ function as described above, the RLC AM bearer may inform the PDCP entity of the information. In addition, the PDCP entity may transmit the information to the other RLC entity such that the other RLC entity discards the duplicate data, thereby preventing unnecessary duplication transmission and preventing waste of transmission resources.

Figure 9:
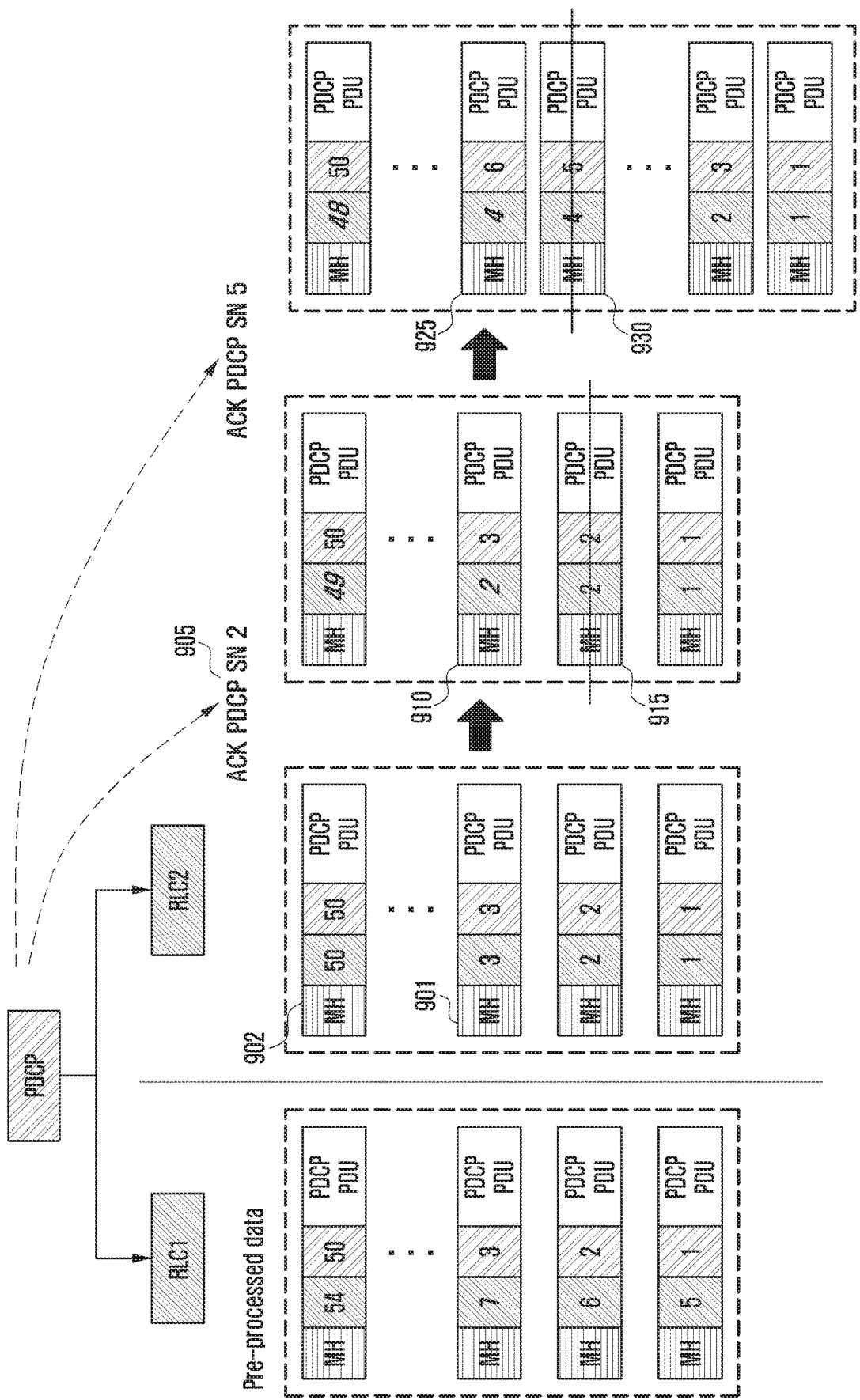
FIG. 9 is a diagram illustrating a problem that may occur when preprocessing data in the case of applying packet duplication transmission to a radio link control acknowledge mode (RLC AM) bearer according to an embodiment of the disclosure.

FIG. 9 is a diagram illustrating a problem that may occur when preprocessing data in the case of applying packet duplication transmission to an RLC AM bearer according to an embodiment of the disclosure.

If packet duplication transmission is configured with respect to an RLC AM bearer, the PDCP entity of a transmitter (a base station or a terminal) may process received data in duplicate, and each RLC entity and MAC entity may perform data-preprocessing. That is, the PDCP entity may assign PDCP sequence numbers to respective pieces of data, and respective RLC entities may assign respective RLC sequence numbers. The RLC sequence numbers used in the primary RLC entity and the secondary RLC entity may be different from each other, and the respective RLC entities assign respective RLC sequence numbers independently. For example, if the data corresponding to PDCP sequence numbers 1 to 50 is duplicated and transmitted to the primary RLC entity and the secondary RLC entity, the primary RLC entity may assign first RLC sequence numbers 5 to 54 to the 51 pieces of data, and the secondary RLC entity may assign second RLC sequence numbers 1 to 50 to the 51 pieces of data. Then, headers of the respective entities are configured, thereby completing the data-preprocessing.

In the case of an RLC AM bearer, since the RLC entity performs an ARQ function, it is possible to receive ACK/NACK information for the data, which is successfully transmitted or fails to be transmitted, through an RLC status PDU. Therefore, the transmitter does not need to continuously transmit the data, which was successfully transmitted in one RLC entity, in the other RLC entity. For example, if the primary RLC entity receives an RLC status report (an RLC status PDU) indicating that the data of PDCP sequence number 2 (first RLC sequence number 6) has been successfully transmitted, the secondary RLC entity no longer needs to transmit the data of PDCP sequence number 2 (second RLC sequence number 2). This is due to the fact that data transmission by the secondary RLC entity may be detected as duplication in the PDCP entity of a receiver (a terminal or a base station) because the receiver has already received the data of PDCP sequence number 2, thereby discarding the duplicate data.

Accordingly, if the secondary RLC entity receives, from the PDCP entity, an indication that the data of PDCP sequence number 2 (second RLC sequence number 2) 915 has been successfully transmitted in the primary RLC entity (905), the secondary RLC entity may discard the data corresponding to PDCP sequence number 2 (second RLC sequence number 2) 915.

If the data corresponding to PDCP sequence number 2 (second RLC sequence number 2) 915 is discarded, the remaining data corresponding to RLC sequence number 3 (901) through RLC sequence number 50 (902) must be reconfigured with RLC sequence numbers. This is due to the fact that the vacancy of RLC sequence number 2 due to discard of the data corresponding to RLC sequence number 2 may cause a problem of an RLC sequence number gap in the receiver, and continuous requests for retransmission may be made, which may lead to disconnection of the link. Therefore, the secondary RLC entity must reassign second RLC sequence numbers to the respective pieces of data from second RLC sequence number 2 (910) to second RLC sequence number 49.

If the secondary RLC entity identifies that the data of PDCP sequence number 5 (reassigned second RLC sequence number 4) 930 has been successfully transmitted, the secondary RLC entity must reassign the data corresponding to existing second RLC sequence numbers 5 to 49 with new second RLC sequence numbers 4 (925) to 48.

Accordingly, if the packet duplication transmission is applied and the data-preprocessing is performed in the RLC AM bearer, there may be a problem that the RLC sequence numbers must be continuously reassigned as shown in FIG. 9, which may increase data-processing complexity in the transmitter.

Figure 10:
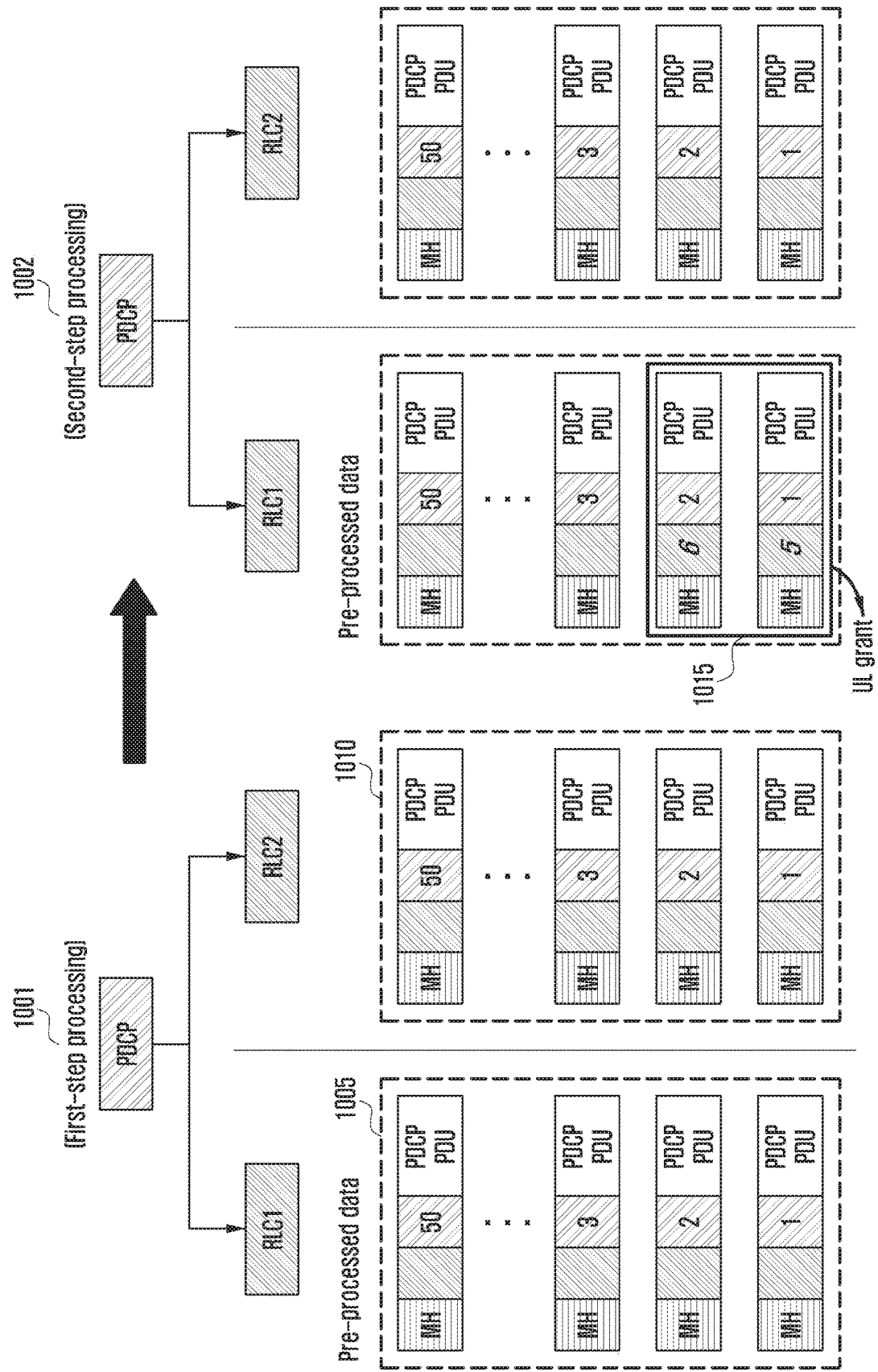
FIG. 10 is a diagram illustrating a first embodiment of a two-step data-processing procedure according to an embodiment of the disclosure.
Figure 11:
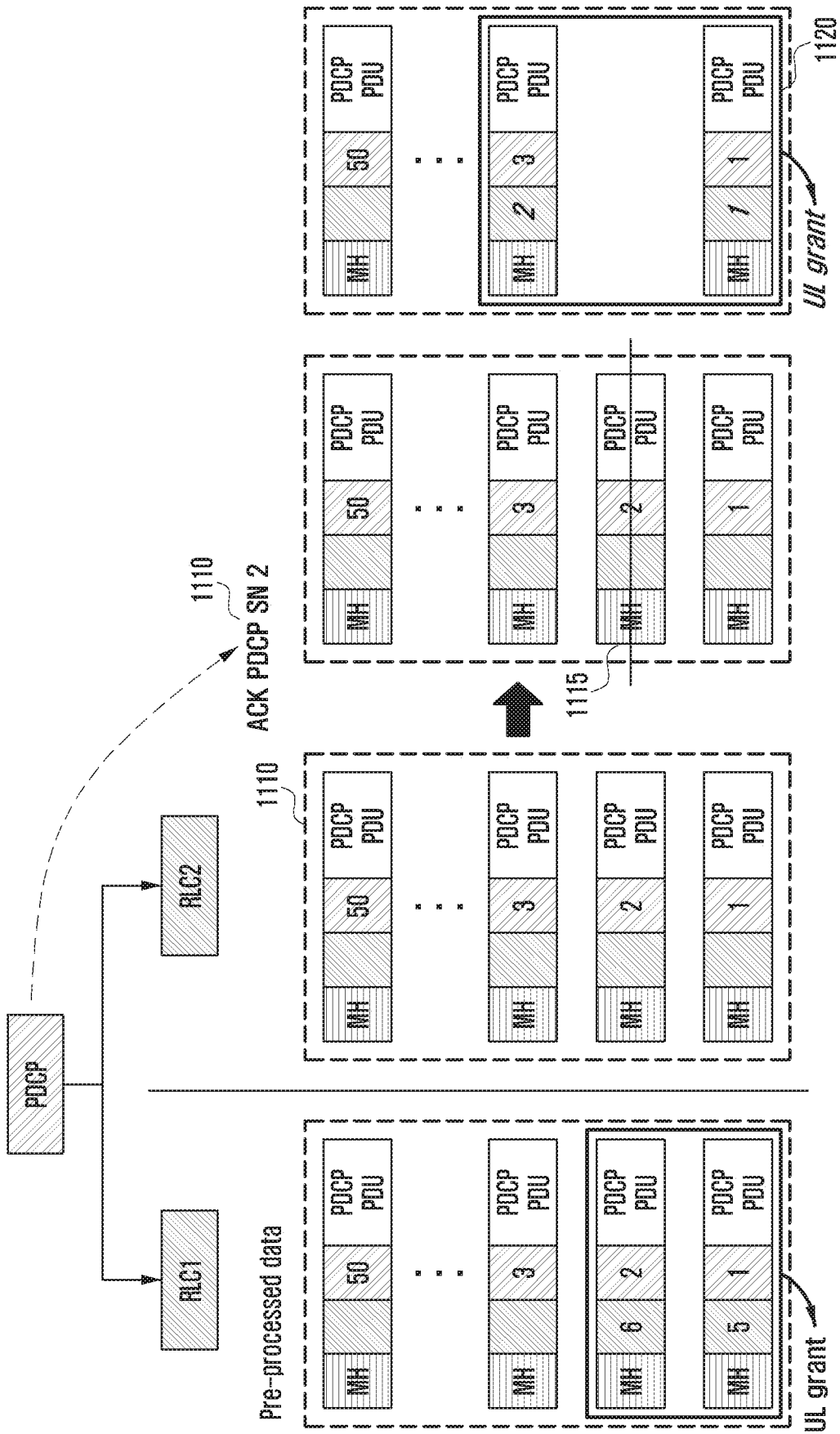
FIG. 11 is a diagram illustrating a first embodiment of a two-step data-processing procedure according to an embodiment of the disclosure.

FIG. 10 is a diagram illustrating a first embodiment of a two-step data-processing procedure according to an embodiment of the disclosure, and FIG. 11 is a diagram illustrating a first embodiment of a two-step data-processing procedure according to an embodiment of the disclosure.

The two-step data-processing procedure proposed in FIG. 10 is as follows.

First Step (1001): A transmitter (a terminal or a base station) performs data-preprocessing on an AM bearer configured with packet duplication transmission before receiving transmission resources. The transmitter performs data-preprocessing as described in FIG. 6. However, the transmitter does not assign RLC sequence numbers. That is, the transmitter does not input a value to the RLC SN field corresponding to the RLC sequence number in the RLC header, and does not perform a process for the RLC SN field (1005 and 1010).

Second Step (1002): If a transmitter (a base station or a terminal) receives (or determines) transmission resources (e.g., uplink transmission resources and an uplink grant), the transmitter may assign RLC sequence numbers, which have not yet been assigned, only to the data, which is fully included in the transmission resources, or a segment of the data included in the transmission resources to thus complete RLC headers, and may process the data to be included in the transmission resources, thereby including the processed data in the transmission resources and transmitting the same (1015). Including data in the transmission resource means transmitting data through the transmit resource.

As described above, if the data is preprocessed in two steps before and after receiving (or determining) the transmission resources, it is possible to avoid the procedure of reassigning and updating the RLC sequence numbers while obtaining benefits of data-preprocessing.

That is, if the PDCP entity transmits, to the secondary RLC entity, information indicating that the primary RLC entity has successfully transmitted the data corresponding to PDCP sequence number 2 as indicated by reference numeral 1110 in FIG. 11, the secondary RLC entity may discard the data corresponding to PDCP sequence number 2 (1115). In addition, if transmission resources are allocated to the secondary RLC entity, the secondary RLC entity may assign RLC sequence numbers to the data conforming to the allocated transmission resources to thus configure data, and may transmit the data (1120).

Therefore, it is possible to prevent the problem of reassignment and update of RLC sequence numbers due to data-preprocessing and successful data transmission of the other RLC entity as described in FIG. 9.

Figure 12:
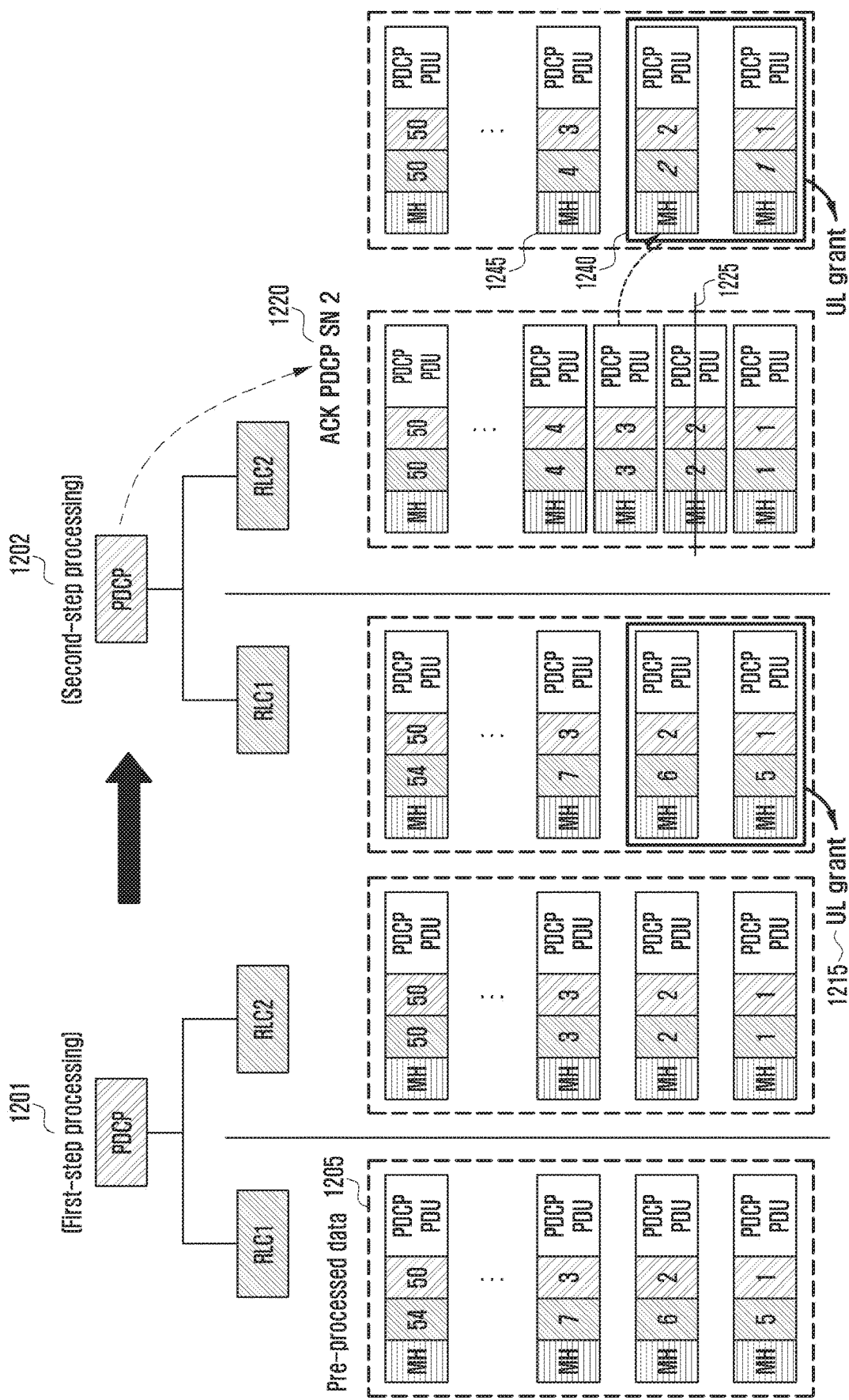
FIG. 12 is a diagram illustrating a second embodiment of a two-step data-processing procedure according to an embodiment of the disclosure.

FIG. 12 is a diagram illustrating a second embodiment of a two-step data-processing procedure according to an embodiment of the disclosure.

The two-step data-processing procedure proposed in FIG. 12 is as follows.

First Step (1201): A transmitter (a terminal or a base station) performs data-preprocessing on an AM bearer configured with packet duplication transmission before receiving transmission resources. The transmitter performs data-preprocessing as described in FIG. 6 (1005 and 1010).

Second Step (1202): If a transmitter (a base station or a terminal) receives (or determines) transmission resources (e.g., uplink transmission resources and an uplink grant), the transmitter may determine whether or not to reassign and update RLC sequence numbers only to the data, which is fully included in the transmission resources, or a segment of the data included in the transmission resources. If reassignment and update of RLC sequence numbers are not necessary, the transmitter configures data to conform to the transmission resources and transmits the same.

However, if the reassignment and update of the RLC sequence numbers are required, the transmitter may reassign and update the RLC sequence numbers to thus complete RLC headers, may process the data to be included in the transmission resources, and may include the data in the transmission resources, thereby transmitting the same (1240). Whether or not to reassign and update the RLC sequence numbers may be determined in consideration of the PDCP sequence number of the data, which is indicated to be discarded because successful transmission of the data from the other RLC entity was identified and thus the data no longer needs to be transmitted, and the RLC sequence number corresponding thereto.

If the data is preprocessed in two steps before and after receiving (or determining) the transmission resources as described above, it is possible to avoid the procedure of reassigning and updating the RLC sequence numbers while obtaining benefits of data-preprocessing.

That is, if the PDCP entity transmits, to the secondary RLC entity, information indicating that the primary RLC entity has successfully transmitted the data corresponding to PDCP sequence number 2, as denoted by reference numeral 1220 in FIG. 12, the secondary RLC entity may discard the data corresponding to PDCP sequence number 2 (1225). In addition, if transmission resources are allocated to the secondary RLC entity, it is necessary to reassign and update RLC sequence numbers to the data conforming to the allocated transmission resources. Thus, the secondary RLC entity may configure data by reassigning RLC sequence numbers thereto, and may then transmit the same (1240).

Therefore, it is possible to prevent the problem of the reassignment and update of RLC sequence numbers according to the data-preprocessing and the indication of successful transmission by the other RLC entity, as described in FIG. 9. In addition, if transmission resources are received (or determined) thereafter, the transmitter may reassign and update RLC sequence numbers to the remaining data (e.g., 1245) according to whether or not the other RLC entity has successfully transmitted data.

Figure 13:
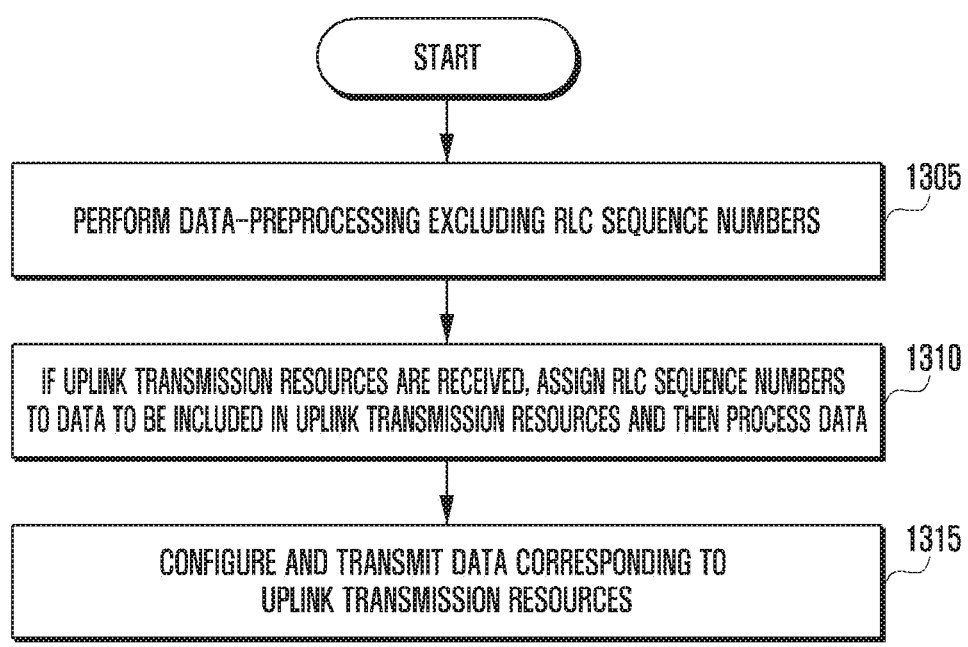
FIG. 13 is a diagram illustrating the operation of a transmitter that performs the packet duplication transmission method illustrated in FIGS. 10 to 12 according to an embodiment of the disclosure.

FIG. 13 is a diagram illustrating the operation of a transmitter that performs the packet duplication transmission method illustrated in FIGS. 10 to 12 according to an embodiment of the disclosure.

Referring to FIG. 13, a transmitter (a terminal or a base station) may perform preprocessing of data excluding RLC sequence numbers (1305). Hereinafter, the operation of a terminal will be described as an example, but the same operation may be applied to a base station.

A first link of the transmitter may discard the data of which successful transmission has been identified in another link (e.g., a second link) if the data has not yet been transmitted. However, if there is no data of which successful transmission has been identified in another link, the above process may be omitted.

Thereafter, if uplink transmission resources are received, the transmitter may assign RLC sequence numbers to the data to be transmitted through the uplink transmission resources, and may process the data (1310). If the transmitter is a base station, the base station may assign downlink transmission resources, and may assign RLC sequence numbers to the data to be transmitted through the downlink transmission resources, thereby processing the data.

Then, the transmitter may transmit the data through the uplink transmission resources (1315).

Meanwhile, the flowchart of FIG. 13 may be modified in part and applied to the case of the two-step data-processing procedure shown in FIG. 12.

Specifically, the transmitter may perform data-preprocessing including assignment of RLC sequence numbers in step 1305.

If the transmitter receives uplink transmission resources in step 1310, the transmitter may determine whether or not to reassign and update the RLC sequence numbers to the data to be transmitted through the uplink transmission resources. If the reassignment and update of RLC sequence numbers are not required, the transmitting terminal configures and transmits data to conform to the transmission resources.

If the reassignment and update of RLC sequence numbers are required, the transmitter may process the data by reassigning and updating RLC sequence numbers thereto, and may transmit the data through the transmission resources in operation 1315.

Figure 14:
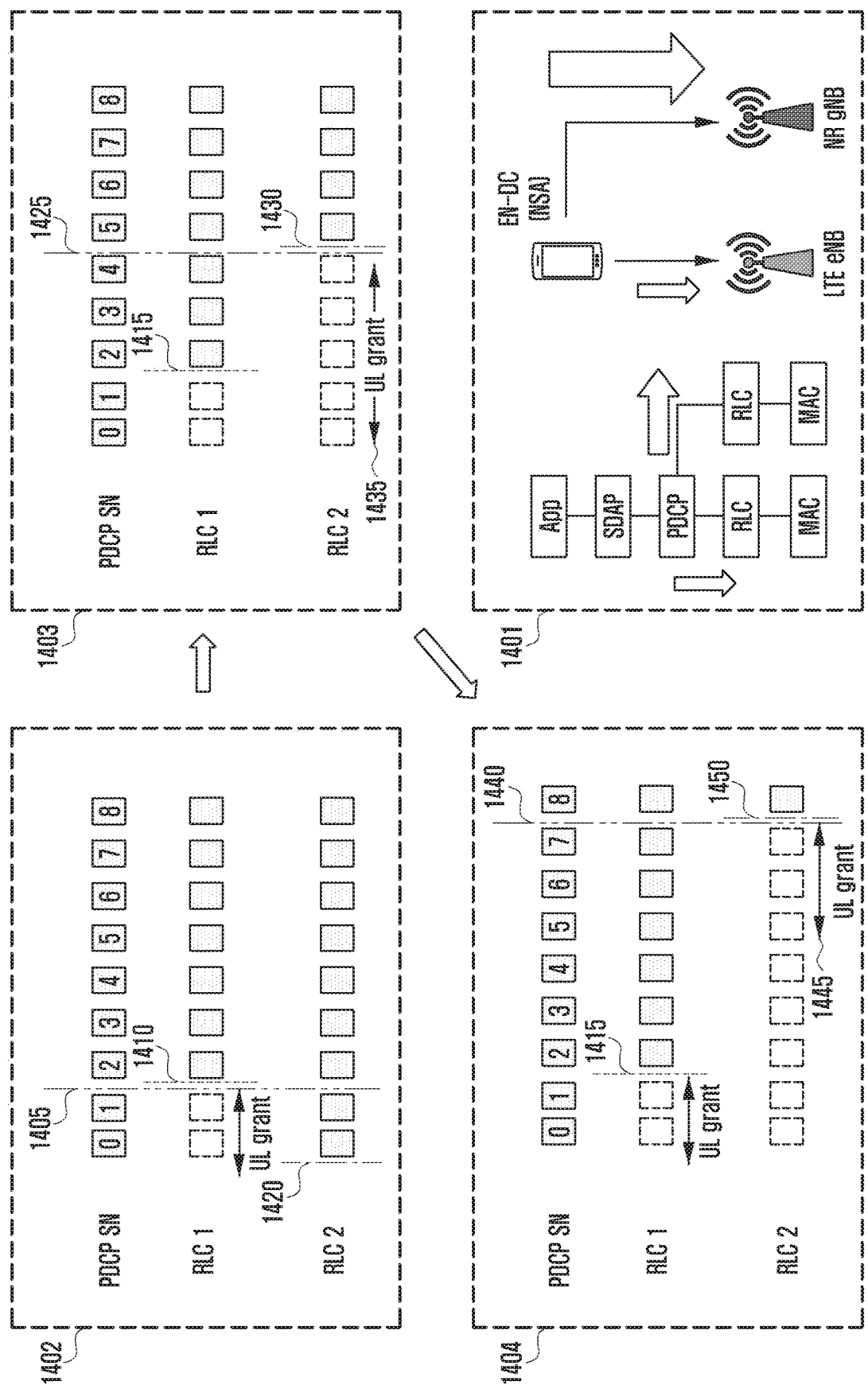
FIG. 14 is a diagram illustrating mismatch of transmission timing, which may occur in two RLC entities or two data transmission links when packet duplication transmission is applied according to an embodiment of the disclosure.

FIG. 14 is a diagram illustrating mismatch of transmission timing, which may occur in two RLC entities or two data transmission links when packet duplication transmission is performed according to an embodiment of the disclosure.

In FIG. 14, a transmitter (e.g., a terminal) may perform packet duplication transmission in dual-connectivity as indicated by reference numeral 1401. In the above dual-connectivity, the terminal may operate as a split bearer connected to an LTE base station and an NR base station, and packet duplication transmission may be applied to the split bearer. Since the NR base station uses a high-frequency band and a wide frequency band, it provides a higher data rate and a lower transmission delay than those of the LTE base station. That is, the NR base station may allocate more uplink transmission resources more frequently than the LTE base station.

In FIG. 14, reference numeral 1402 denotes respective pieces of data to which PDCP sequence numbers are assigned. Then, the respective pieces of data, to which the PDCP sequence numbers are allocated, may be duplicated by applying packet duplication transmission, and the primary RLC entity and the secondary RLC entity may assign independent RLC sequence numbers of each RLC entity to the duplicated data. However, the RLC sequence numbers are omitted in the drawing for the convenience of description, and the following description will be made based on the PDCP sequence numbers.

In FIG. 14, reference numeral 1405 denotes a lower edge of a PDCP transmission window, and may be represented by a variable "PDCP_TX_NEXT". Reference numeral 1410 denotes a lower edge of a first RLC transmission window, and may be represented by a variable "RLC_TX_NEXT". In addition, reference numeral 1420 denotes a lower edge of a second RLC transmission window, and may be represented by a variable "RLC_TX_NEXT".

Whenever the PDCP entity transmits data assigned with the PDCP sequence numbers to a lower entity, the PDCP entity shifts the lower edge 1405 of the PDCP transmission window to the rear of the data corresponding to the transmitted PDCP sequence number. The size of the PDCP transmission window may be calculated as "2^(PDCP sequence number length−1)". That is, the lower edge of the PDCP transmission window may mean the starting point of the PDCP transmission window, and may be configured as "sequence number of transmitted data+1".

In addition, in the case where each RLC entity operates in an RLC UM mode, whenever the RLC entity transmits data assigned with the RLC sequence numbers, the RLC entity shifts the lower edge 1410 or 1420 of the RLC transmission window to the rear of the data corresponding to the transmitted RLC sequence number. The size of the RLC transmission window may be calculated as "2^(RLC sequence number length−1)".

In addition, in the case that each RLC entity operates in an RLC AM mode, if ACKs for all RLC sequence numbers less than the smallest RLC sequence number, among the RLC sequence numbers of which ACKs have been received as a result of referring to an RLC status report (RLC status PDU) received from the receiver, are received, the RLC entity shifts the lower edge 1410 or 1420 of the RLC transmission window to the rear of the data corresponding to the RLC sequence number, instead of shifting the lower edge every time the data assigned with the RLC sequence numbers is transmitted. The size of the RLC transmission window may be calculated as "2^(RLC sequence number length−1)".

If uplink transmission resources 1415 are allocated to the link corresponding to the primary RLC entity from a base station (e.g., an LTE base station) as denoted by reference numeral 1402 in FIG. 14, the PDCP entity transmits the data corresponding to the uplink transmission resources to a lower RLC entity, and shifts the lower edge of the PDCP transmission window as denoted by reference numeral 1405. Then, the primary RLC entity may transmit data corresponding to the uplink transmission resource, and may shift the lower edge of the first RLC transmission window as denoted by reference numeral 1410.

If uplink transmission resources 1435 are allocated to the link corresponding to the secondary RLC entity from a base station (e.g., an NR base station) as denoted by reference numeral 1403 in FIG. 14, the PDCP entity transmits the data corresponding to the uplink transmission resources to a lower RLC entity, and may shift the lower edge of the PDCP transmission window as indicated by reference numeral 1425 (in consideration of the size of the data that has already been transmitted through the secondary RLC entity). Then, the secondary RLC entity may transmit data corresponding to the uplink transmission resources, and may shift the lower edge of the second RLC transmission window as indicated by reference numeral 1430.

If uplink transmission resources 1445 are allocated again to the link corresponding to the secondary RLC entity from a base station (e.g., an NR base station) as denoted by reference numeral 1404 in FIG. 14, the PDCP entity transmits the data corresponding to the uplink transmission resources to a lower RLC entity, and may shift the lower edge of the PDCP transmission window as indicated by reference numeral 1440 (in consideration of the size of the data that has already been transmitted through the secondary RLC entity). Then, the secondary RLC entity may transmit data corresponding to the uplink transmission resources, and may shift the lower edge of the second RLC transmission window as indicated by reference numeral 1450.

As a result, referring to reference numeral 1404 in FIG. 14, the primary RLC entity transmits the data corresponding to PDCP sequence number 2 in the next transmission, and the secondary RLC entity transmits the data corresponding to PDCP sequence number 8 in the next transmission. That is, in the case in which packet duplication transmission is used for the dual-connectivity of the LTE base station and the NR base station, there is a difference in the data transmission time, which may cause a problem that one RLC entity transmits data too late in an RLC UM mode in which a transmission delay is important. In addition, the duplication transmission time of the same data may significantly differ between 1415 and 1450, thereby lowering the efficiency of packet duplication transmission. Further, the above problem may also occur in the case where the packet duplication transmission is used for carrier aggregation.

The dual-connectivity with the LTE base station and the NR base station is described with reference to the drawing, but the embodiments of the disclosure are not limited thereto, and the disclosure may be applied to the dual-connectivity between the LTE base station and the LTE base station or to the dual-connectivity between the NR base station and the NR base station in the same manner. In addition, the base station using dual-connectivity may be referred to as a "first base station" or a "second base station".

The above-mentioned difference in the duplication transmission time may be overcome in the packet duplication transmission using an RLC AM mode. This is due to the fact that if the successful transmission of some data in one RLC entity is identified through the RLC status report in the case of the operation in the RLC AM mode, as described in FIG. 9, the other RLC entity may discard the data. That is, the difference in the duplication transmission time may be severe in the packet duplication transmission using the RLC UM mode.

Figure 15:
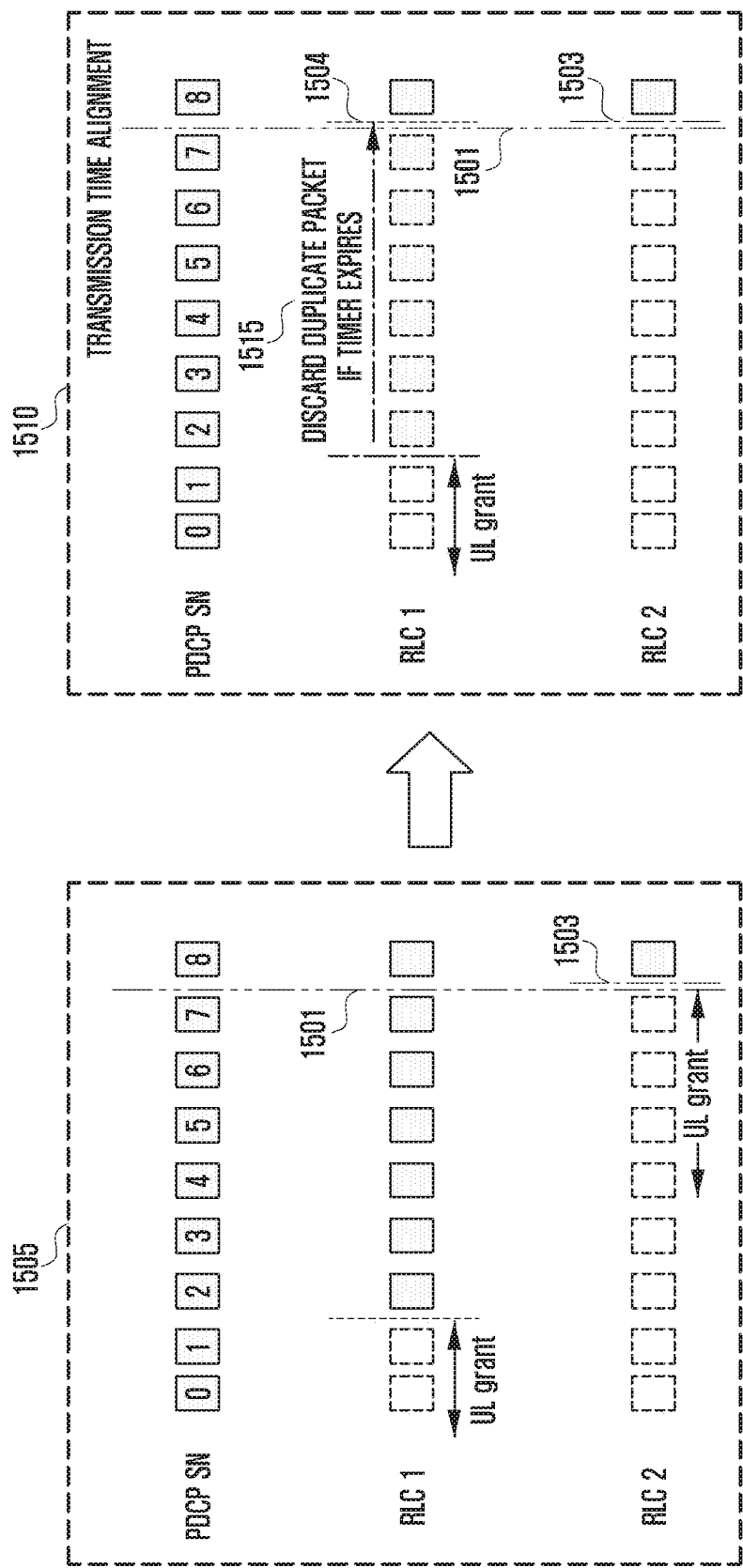
FIG. 15 is a diagram illustrating a first embodiment to overcome the difference in the packet duplication transmission time, which may be generated when packet duplication transmission is performed in a radio link control un-acknowledge mode RLC UM mode according to an embodiment of the disclosure.

FIG. 15 is a diagram illustrating a first embodiment to overcome the difference in the packet duplication transmission time, which may occur when the packet duplication transmission is used in an RLC UM mode according to an embodiment of the disclosure.

In FIG. 15, if packet duplication transmission is activated, a transmitter (a terminal or a base station) may set a timer, and may discard the data of the primary RLC entity and the secondary RLC entity (e.g., RLC SDUs or RLC PDUs) based on a PDCP transmission window lower edge 1501 every time the timer expires or periodically.

For example, as described with reference to FIG. 14, a duplication transmission time of the same packet may significantly differ between the primary RLC entity (1510) and the secondary RLC entity (1505). Therefore, if packet duplication transmission is activated in the RLC UM mode, the transmitter may set a timer, and may discard the data of the primary RLC entity and the secondary RLC entity (e.g., RLC SDUs or RLC PDUs) based on the PDCP transmission window lower edge 1501 every time the timer expires or periodically (1515).

That is, the PDCP entity may transmit, to the primary RLC entity and the secondary RLC entity, an indicator to discard the data corresponding to PDCP sequence numbers smaller than the PDCP transmission window lower edge, and the RLC entities may discard the data corresponding to the indicator. (Alternatively, if a segment of the data to be discarded has already been transmitted, the data may not be discarded.)

Then, the primary RLC entity may shift the lower edge of the RLC transmission window to the line of a first RLC sequence number corresponding to the PDCP sequence number of the lower edge of the PDCP transmission window of the PDCP entity so as to align the same with each other (1504).

In addition, the secondary RLC entity may shift the lower edge of the RLC transmission window to the line of a second RLC sequence number corresponding to the PDCP sequence number of the lower edge of the PDCP transmission window of the PDCP entity so as to align the same with each other (1503).

Therefore, it is possible to align the packet duplication transmission times of the primary RLC entity and the secondary RLC entity with each other (transmission time alignment) periodically or every time the timer expires (1501).

Although a method in which the PDCP entity instructs the RLC entity to discard data has been described in the disclosure, the disclosure is not limited thereto. That is, the RLC entity may operate a timer, may discard data according to the expiration of the timer, and may shift the lower edge of the RLC window to be aligned with the lower edge of the PDCP window.

Figure 16:
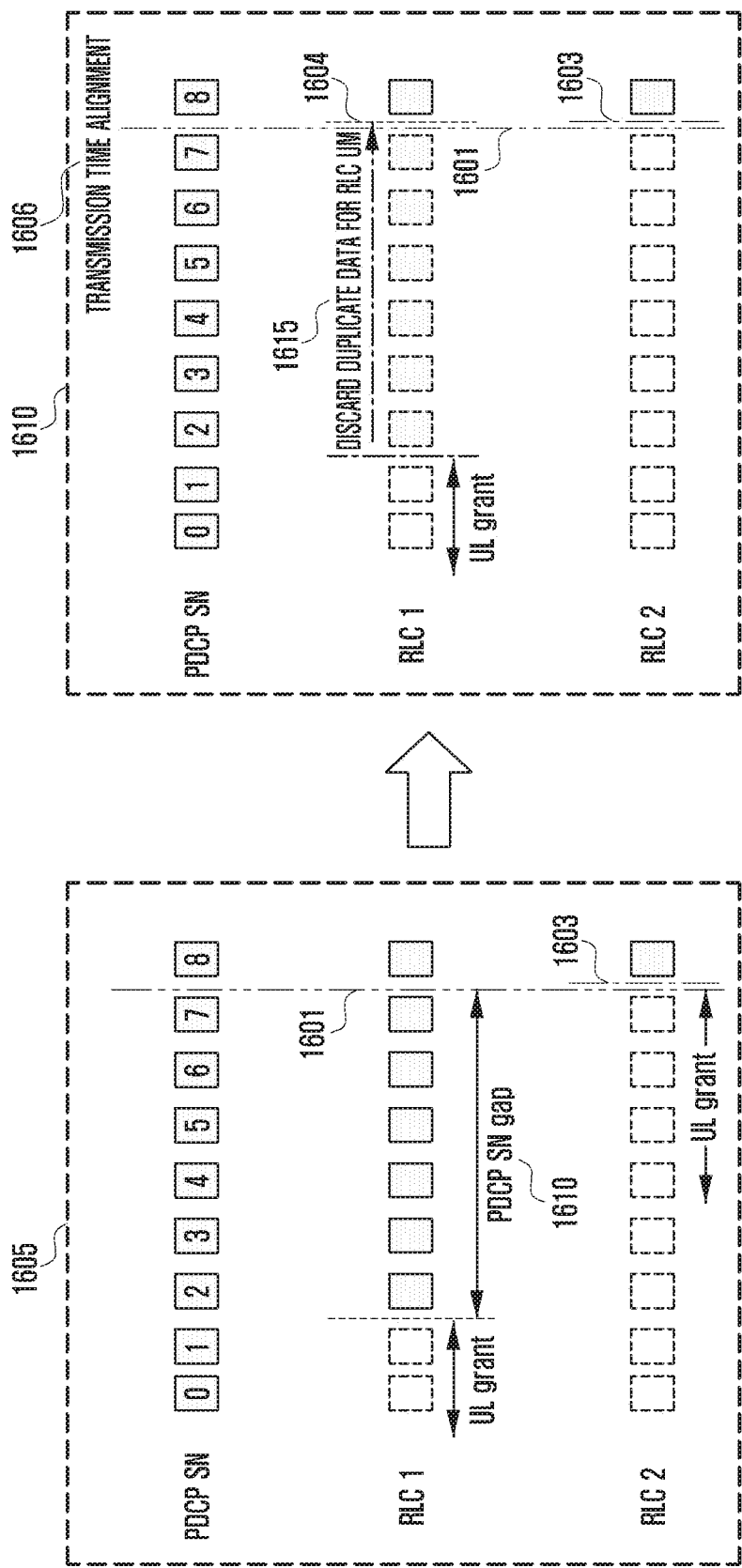
FIG. 16 is a diagram illustrating a second embodiment to overcome the difference in packet duplication transmission time, which may be generated when packet duplication transmission is performed in the RLC UM mode described in FIG. 14 according to an embodiment of the disclosure.

FIG. 16 is a diagram illustrating a second embodiment to overcome the difference in packet duplication transmission time, which may occur when packet duplication transmission is used in the RLC UM mode described in FIG. 14 according to an embodiment of the disclosure.

In FIG. 16, in the case where packet duplication transmission is activated, if the difference between the PDCP sequence number (or RLC sequence number) corresponding to the lower edge of the RLC transmission window of the primary RLC entity and the PDCP sequence number (or RLC sequence number) corresponding to the lower edge of the RLC transmission window of the secondary RLC entity exceeds a predetermined threshold value based on the PDCP sequence number and RLC sequence number, a transmitter (a terminal or a base station) may discard data (e.g., RLC SDUs or RLC PDUs) of the primary RLC entity and the secondary RLC entity based on the PDCP transmission window lower edge (1601).

The threshold value may be configured by the base station using an RRC message, or may be configured through terminal implementation. In addition, the PDCP entity, the primary RLC entity, and the secondary RLC entity may utilize mapping table information between the PDCP sequence numbers, the first RLC sequence numbers, and the second RLC sequence numbers, thereby calculating a data transmission time difference as a PDCP sequence number difference or an RLC sequence number difference.

For example, a duplication transmission time of the same packet may significantly differ between the primary RLC entity and the secondary RLC entity as denoted by reference numeral 1605 (1610).

Therefore, in the case where packet duplication transmission is activated in the RLC UM mode, the transmitter may calculate and compare the difference between the PDCP sequence number (or RLC sequence number) corresponding to the lower edge of the RLC transmission window of the primary RLC entity and the PDCP sequence number (or RLC sequence number) corresponding to the lower edge of the RLC transmission window of the secondary RLC entity based on the PDCP sequence numbers and RLC sequence numbers according to a predetermined threshold value, and if the difference exceeds the predetermined threshold value, the transmitter may discard data (e.g., RLC SDUs or RLC PDUs) of the primary RLC entity and the secondary RLC entity based on the PDCP transmission window lower edge 1601 (1615).

That is, the PDCP entity may transmit, to the primary RLC entity and the secondary RLC entity, an indicator to discard PDCP sequence numbers smaller than the PDCP transmission window lower edge, and the RLC entities may discard the data corresponding to the indicator. (Alternatively, if a segment of the data to be discarded has already been transmitted, the data may not be discarded.)

Then, the transmitter may shift the lower edge of the RLC transmission window to the line of the first RLC sequence number corresponding to the PDCP sequence number of the lower edge of the transmission PDCP entity of the PDCP entity so as to align the same with each other (1604).

In addition, the transmitter may shift the lower edge of the RLC transmission window of the secondary RLC entity to the line of the second RLC sequence number corresponding to the PDCP sequence number of the lower edge of the PDCP transmission window of the PDCP entity so as to align the same with each other (1603).

Therefore, it is possible to determine whether or not the difference in the duplication transmission time becomes large using the gap between the sequence numbers, and, if the difference exceeds a predetermined threshold value, to align the packet duplication transmission times for the same packet between the primary RLC entity and the secondary RLC entity with each other as proposed above (transmission time alignment) (1606).

Figure 17:
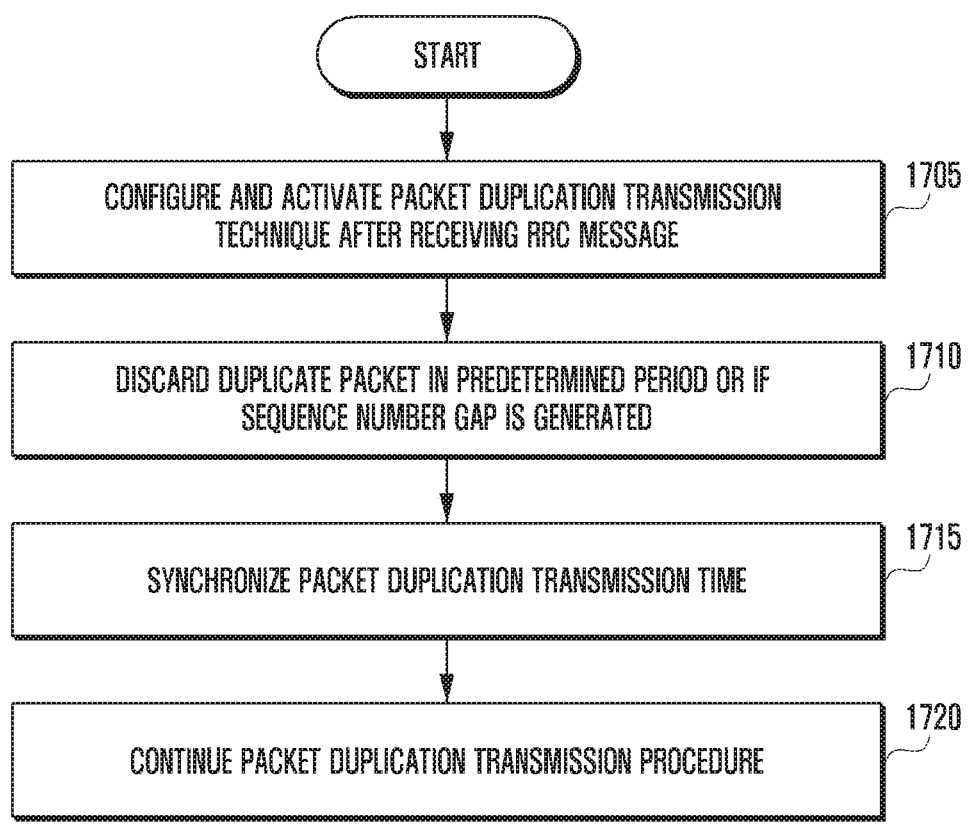
FIG. 17 is a diagram illustrating the operation of a terminal that performs a synchronization method of a packet duplication transmission time described in FIGS. 15 and 16 according to an embodiment of the disclosure.

FIG. 17 is a diagram illustrating the operation of a terminal that performs a synchronization method of a packet duplication transmission time described with reference to FIGS. 15 and 16 according to an embodiment of the disclosure.

In FIG. 17, a transmitter (a terminal or a base station) may receive a configuration of packet duplication transmission through an RRC message, and may activate the packet duplication transmission using the RRC message or MAC CE information. Thus, the transmitter may perform a packet duplication transmission procedure (1705).

The transmitter may discard duplicate packets according to predetermined conditions. Specifically, the transmitter may discard data (e.g., RLC SDUs or RLC PDUs) of the primary RLC entity and the secondary RLC entity based on the PDCP transmission window lower edge in a predetermined period or if the difference between the PDCP sequence number (or RLC sequence number) corresponding to the lower edge of the RLC transmission window of the primary RLC entity and the PDCP sequence number (or RLC sequence number) corresponding to the lower edge of the RLC transmission window of the secondary RLC entity exceeds a predetermined threshold value based on the PDCP sequence numbers or the RLC sequence numbers (1710). For example, the transmitter may discard the data that has already been transmitted in the PDCP entity in a predetermined period or if the difference between the sequence numbers (PDCP or RLC sequence numbers) of the data that has already been transmitted in the primary RLC entity and the secondary RLC entity exceeds a threshold value. As another example, the transmitter may discard the data that has already been transmitted in the PDCP layer in a predetermined period or if the difference between the sequence numbers (PDCP or RLC sequence numbers) of the data to be subsequently transmitted in the primary RLC entity and the secondary RLC entity exceeds a threshold value.

The predetermined period may be determined based on the value of the timer described above, may be configured by the base station, or may be predetermined. In addition, the threshold value may be predetermined, may be configured by the base station using an RRC message, or may be configured through terminal implementation.

Further, the PDCP entity, the primary RLC entity, and the secondary RLC entity may utilize mapping table information between the PDCP sequence numbers, the first RLC sequence numbers, and the second RLC sequence numbers, thereby calculating a data transmission time difference as a PDCP sequence number difference or an RLC sequence number difference.

Therefore, it is possible to determine whether or not the difference in the duplication transmission time becomes large using the gap between the sequence numbers, and to synchronize the packet duplication transmission times for the same packet between the primary RLC entity and the secondary RLC entity with each other in a predetermined period or if the difference exceeds a predetermined threshold value (1715).

That is, the transmitter may shift the lower edge of the RLC transmission window of the primary RLC entity to the line of a first RLC sequence number corresponding to the PDCP sequence number of the lower edge of the PDCP transmission window of the PDCP entity so as to align the same with each other. In addition, the transmitter may shift the lower edge of the RLC transmission window of the secondary RLC entity to the line of a second RLC sequence number corresponding to the PDCP sequence number of the lower edge of the PDCP transmission window of the PDCP entity so as to align the same with each other.

Then, the transmitter may continue to perform the packet duplication transmission procedure (1720).

Figure 18:
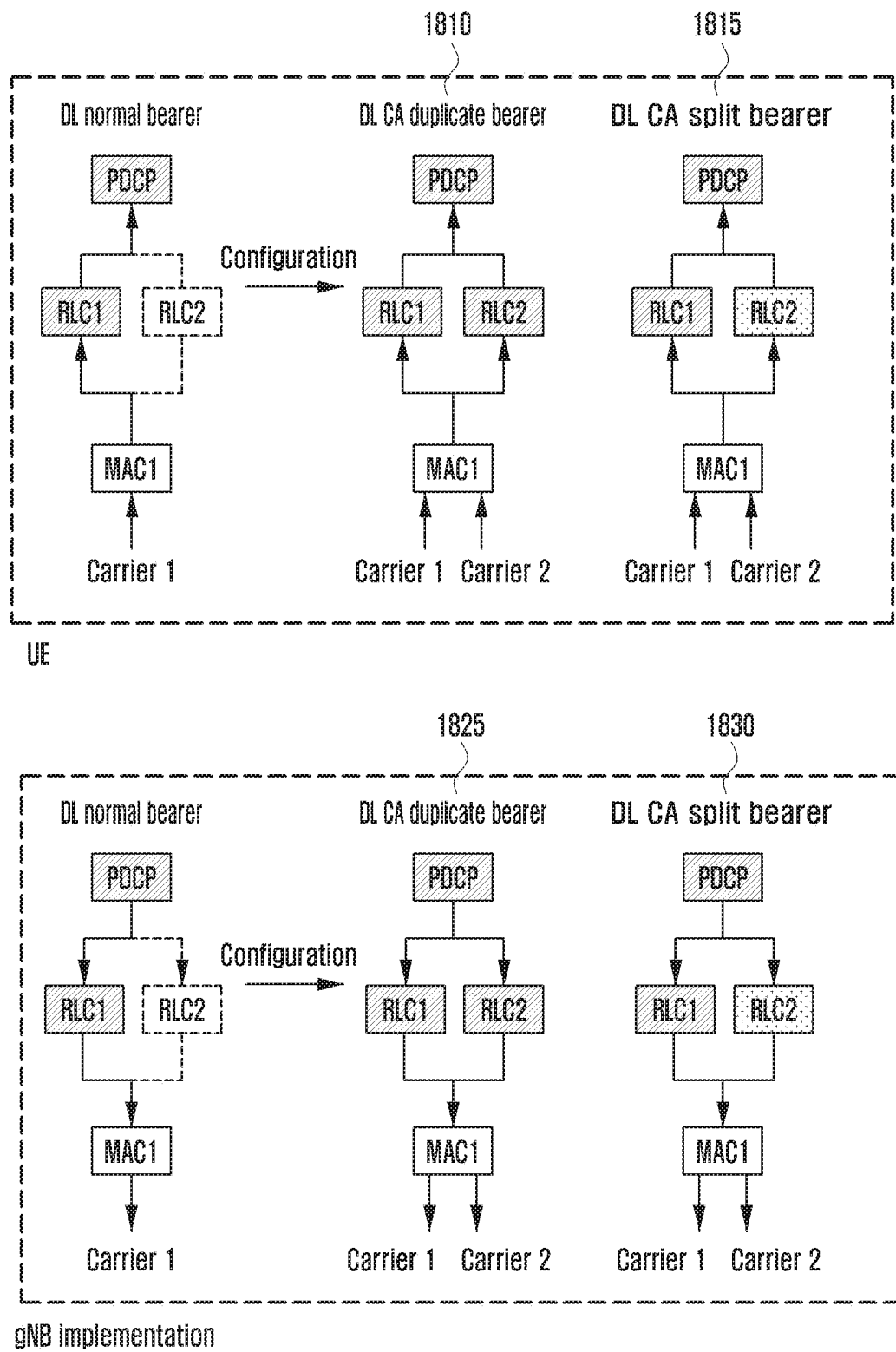
FIG. 18 is a diagram illustrating a method of increasing a data rate of a bearer according to an embodiment of the disclosure.

FIG. 18 is a diagram illustrating a method of increasing a data rate of a bearer according to an embodiment of the disclosure.

Referring to FIG. 18, in the next-generation mobile communication system of the disclosure, a base station may configure packet duplication transmission using carrier aggregation (CA packet duplication) to a specific bearer of a terminal. In this case, the base station may transmit different data to the primary RLC entity (a first logical channel identifier) and the secondary RLC entity (a second logical channel identifier), respectively, instead of transmitting duplicate downlink data to the bearer, thereby improving a data rate of the bearer, which may be referred to as "downlink carrier aggregation-based split bearer (DL CA split bearer)".

The downlink carrier aggregation-based split bearer proposed in the disclosure may be equally extended and applied to the downlink dual-connectivity-based packet duplication transmission.

If a configuration of packet duplication transmission is received from the base station using an RRC message as described above with reference to FIG. 5, the terminal may use packet duplication transmission.

If the packet duplication transmission is configured in carrier aggregation (1810), two RLC entities (i.e., a primary RLC entity and a secondary RLC entity) may be configured to the bearer or PDCP entity configured with the packet duplication transmission.

If the packet duplication transmission is deactivated, the PDCP entity transmits a packet only to the primary RLC entity in the uplink transmission, and does not transmit a packet to the secondary RLC entity.

If the packet duplication transmission is activated, the PDCP entity may transmit the same packet to each of two lower RLC entities (the primary RLC entity and the secondary RLC entity) in duplicate in the uplink transmission. That is, the PDCP entity may transmit one packet to the primary RLC entity, and may duplicate the packet to thus transmit the same packet to the secondary RLC entity.

If the packet duplication transmission is configured and is activated in carrier aggregation, a MAC entity 1815 may transmit the data received from the primary RLC entity and the secondary RLC entity, which have different logical channel identifiers as each other, through different carriers.

The above procedure relates to uplink data transmission, and as to the downlink data reception, the terminal must be always able to receive downlink data to which packet duplication transmission is applied (1810). Although it is impossible to transmit uplink data to the secondary RLC entity in duplicate due to the deactivation of the uplink packet duplication transmission, the secondary RLC entity must receive and process downlink data from the MAC entity to then transmit the same to the PDCP entity.

As described above, if the packet duplication transmission is configured in FIG. 18, the terminal is always able to receive downlink data with respect to the primary RLC entity (the first logical channel identifier) and the secondary RLC entity (the second logical channel identifier). Thus, the terminal may receive duplicate data from the base station through the primary RLC entity (the first logical channel identifier) and the secondary RLC entity (second logical channel identifier) as indicated by reference numeral 1810, and may receive different data from the base station through the primary RLC entity (the first logical channel identifier) and the secondary RLC entity (second logical channel identifier) as indicated by reference numeral 1815.

In the disclosure, the base station may configure packet duplication transmission using carrier aggregation to a specific bearer of the terminal, and may use packet duplication transmission with respect to the bearer as necessary, thereby providing a low transmission delay and high reliability for the downlink (1825). In addition, the base station may transmit different data to the bearer, instead of using the packet duplication transmission, thereby providing a high data rate for the downlink (1830).

That is, the disclosure proposes a method in which a base station configures packet duplication transmission using carrier aggregation to a specific bearer of a terminal, and transmits different downlink data to the bearer through a primary RLC entity (a first logical channel identifier) and a secondary RLC entity (a second logical channel identifier) as necessary, thereby supporting a high downlink data rate (1830).

According to the above method, the terminal may receive different pieces of data for the bearer from different carriers, and the different pieces of data may be processed by different logical channel identifiers, so that it is possible to support a high data rate. In addition, since different pieces of data are processed in two RLC entities, it is possible to obtain a parallel processing effect, thereby more quickly performing data reception processing.

The downlink carrier aggregation-based split bearer proposed in the disclosure may be equally extended and applied to the downlink dual-connectivity-based packet duplication transmission.

Figure 19A:
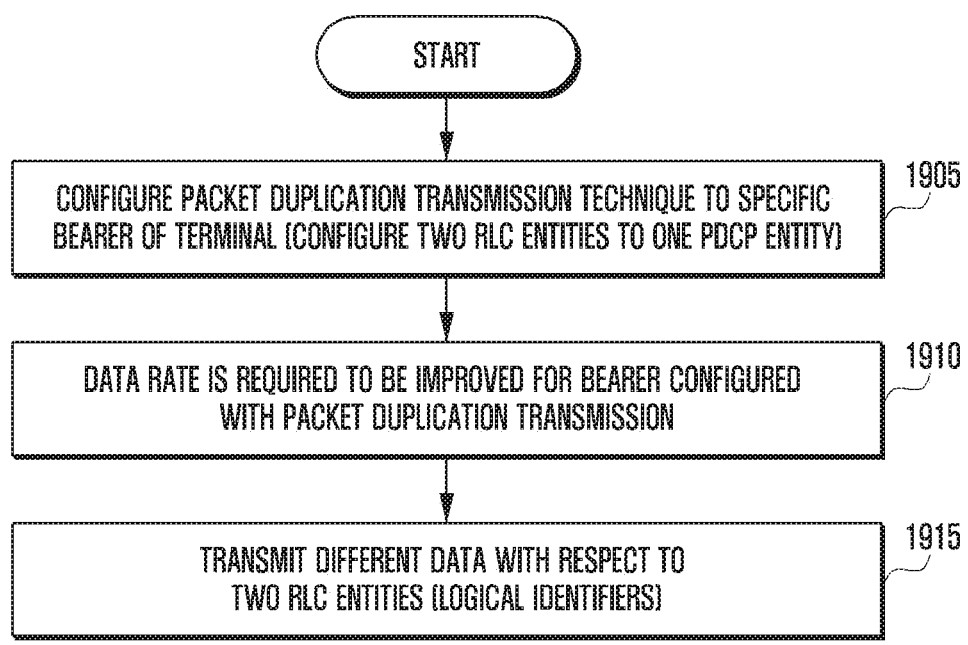
FIG. 19A is a diagram illustrating a method of increasing a data rate of a bearer by transmitting different data to a bearer configured with packet duplication transmission according to an embodiment of the disclosure.
Figure 19B:
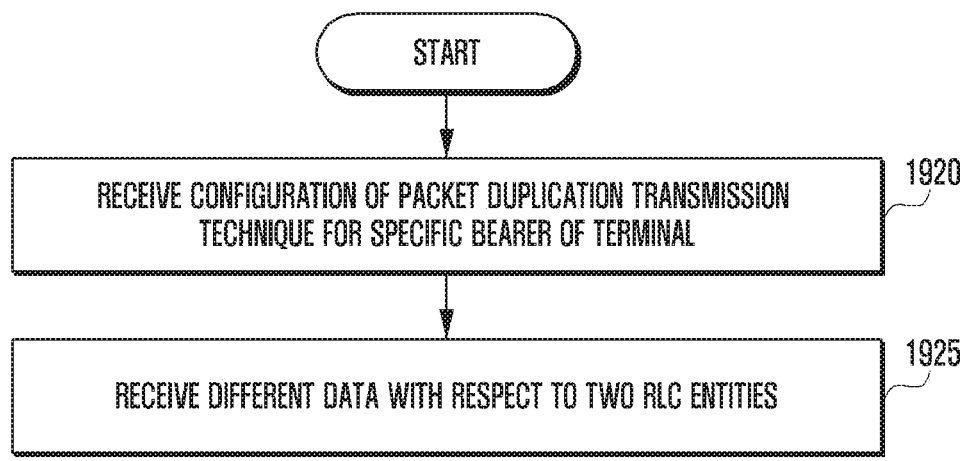
FIG. 19B is a diagram illustrating a method of increasing a data rate of a bearer by transmitting different data to a bearer configured with packet duplication transmission according to an embodiment of the disclosure.

FIG. 19A is a diagram illustrating a method of increasing a data rate of a bearer by transmitting different data to a bearer configured with packet duplication transmission according to an embodiment of the disclosure, and FIG. 19B is a diagram illustrating a method of increasing a data rate of a bearer by transmitting different data to a bearer configured with packet duplication transmission according to an embodiment of the disclosure.

Referring to FIG. 19A, the base station may configure packet duplication transmission to a specific bearer (1905). That is, the base station may transmit a configuration of two RLC entities for one PDCP entity. In addition, the base station may transmit configuration information about the packet duplication transmission through an RRC message. In this case, the packet duplication transmission may be configured such that the configuration of one PDCP entity is associated with the configuration of two RLC entities, and an indicator indicating whether or not to configure the packet duplication transmission may be transmitted through an RRC message. The configuration method of the packet duplication transmission may be applied to other embodiments of the disclosure, as well as this embodiment.

In addition, the base station may determine whether or not it is necessary to improve the data rate of the bearer configured with the packet duplication transmission (1910).

If it is determined that the data rate is required to be improved, the base station may transmit different data to two RLC entities (1915). In this way, the base station may improve a data rate.

Referring to FIG. 19B, the terminal may configure packet duplication transmission to a specific bearer (1920).

That is, the terminal may receive a configuration of two RLC entities for one PDCP entity. In addition, the terminal may receive configuration information about the packet duplication transmission through an RRC message.

If it is necessary to improve the data rate for the bearer configured with the packet duplication transmission, the terminal may receive different data for the two RLC entities (1925).

Meanwhile, the content of the disclosure may be applied to the uplink in the same manner. That is, the terminal may receive a configuration of packet duplication transmission for a specific bearer, and may then transmit different data to the base station for the bearer configured with the packet duplication transmission according to an instruction of the base station or a determination of the terminal. The detailed operation thereof is similar to the operation in the downlink, and thus a description thereof will be omitted below.

In addition, the disclosure may be extended and applied to a central unit and distributed unit (CU-DU) split structure, which is an example of base station implementation. That is, the disclosure may be extended and applied to a structure in which a CU manages PDCP entities and a DU manages the remaining lower entities (RLC entities, MAC entities, PHY entities, and the like).

Figure 20:
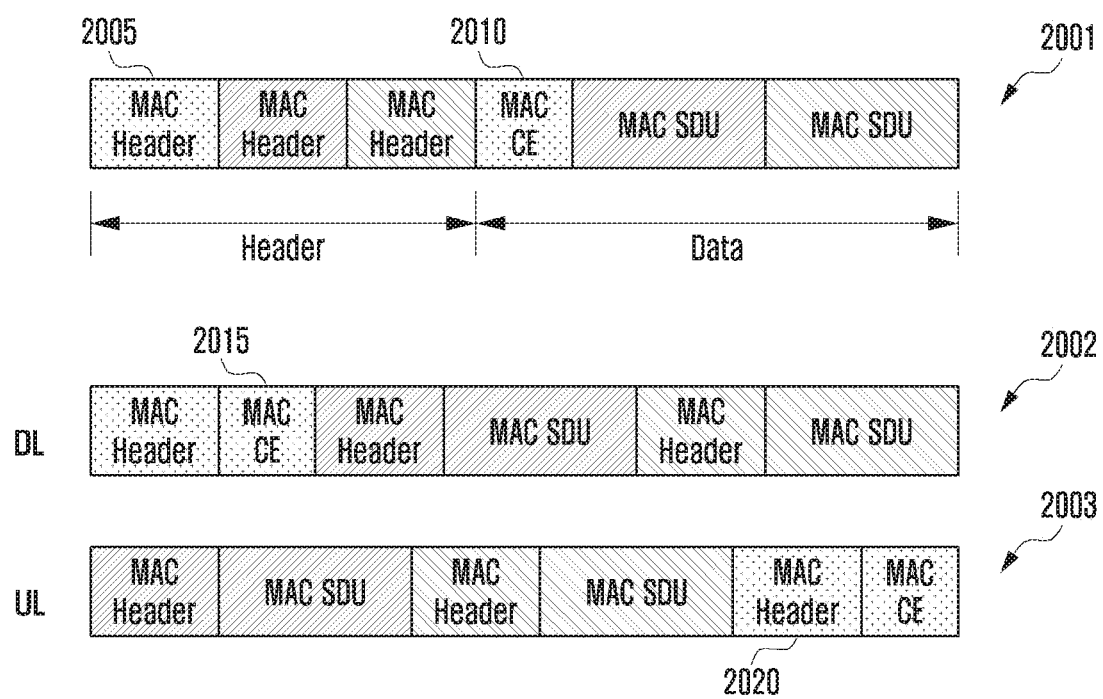
FIG. 20 is a diagram illustrating the structure of a medium access control protocol data unit (MAC PDU) supported by the next-generation mobile communication system according to an embodiment of the disclosure.

FIG. 20 is a diagram illustrating the structure of a MAC PDU supported by a next-generation mobile communication system according to an embodiment of the disclosure.

The MAC PDU supported by an LTE system in FIG. 20 has a structure 2001 in which all MAC headers corresponding to MAC SDUs or MAC control information are positioned at the front, and all the MAC SDUs or the MAC CE corresponding to data are positioned at the rear. Therefore, it is difficult to update, remove, or add MAC control information. This is due to the fact that the header 2005 of the MAC CE is positioned at the front and the control information portion 2010 of the MAC CE is positioned in the middle.

In FIG. 20, reference numeral 2002 denotes the structure of a MAC PDU supported in the downlink of a next-generation mobile communication system. The next-generation mobile communication system supports a MAC PDU structure in which a header and data are repeated as one unit. That is, the MAC PDU has a structure in which headers and data are alternately repeated. In addition, in the MAC PDU structure supported in the downlink as indicated by reference numeral 2002, the MAC CE 2015 is always positioned at the front, so that the terminal may quickly read the MAC control information.

In FIG. 20, reference numeral 2003 denotes the structure of a MAC PDU supported in the uplink of a next-generation mobile communication system. The next-generation mobile communication system supports a MAC PDU structure in which a header and data are repeated as one unit. That is, the MAC PDU has a structure in which headers and data are alternately repeated. In addition, in the MAC PDU structure supported in the uplink as indicated by reference numeral 2003, the MAC CE 2020 is always positioned at the rear end (2020), so that the terminal processes and generates general data first and processes and generates dynamic MAC control information in parallel later, thereby reducing processing time.

As described above, since the MAC control information is separated and positioned at the front end or rear end of the MAC PDU structure in the next-generation mobile communication system, it is easy to update, remove or add the MAC control information.

Figure 21:
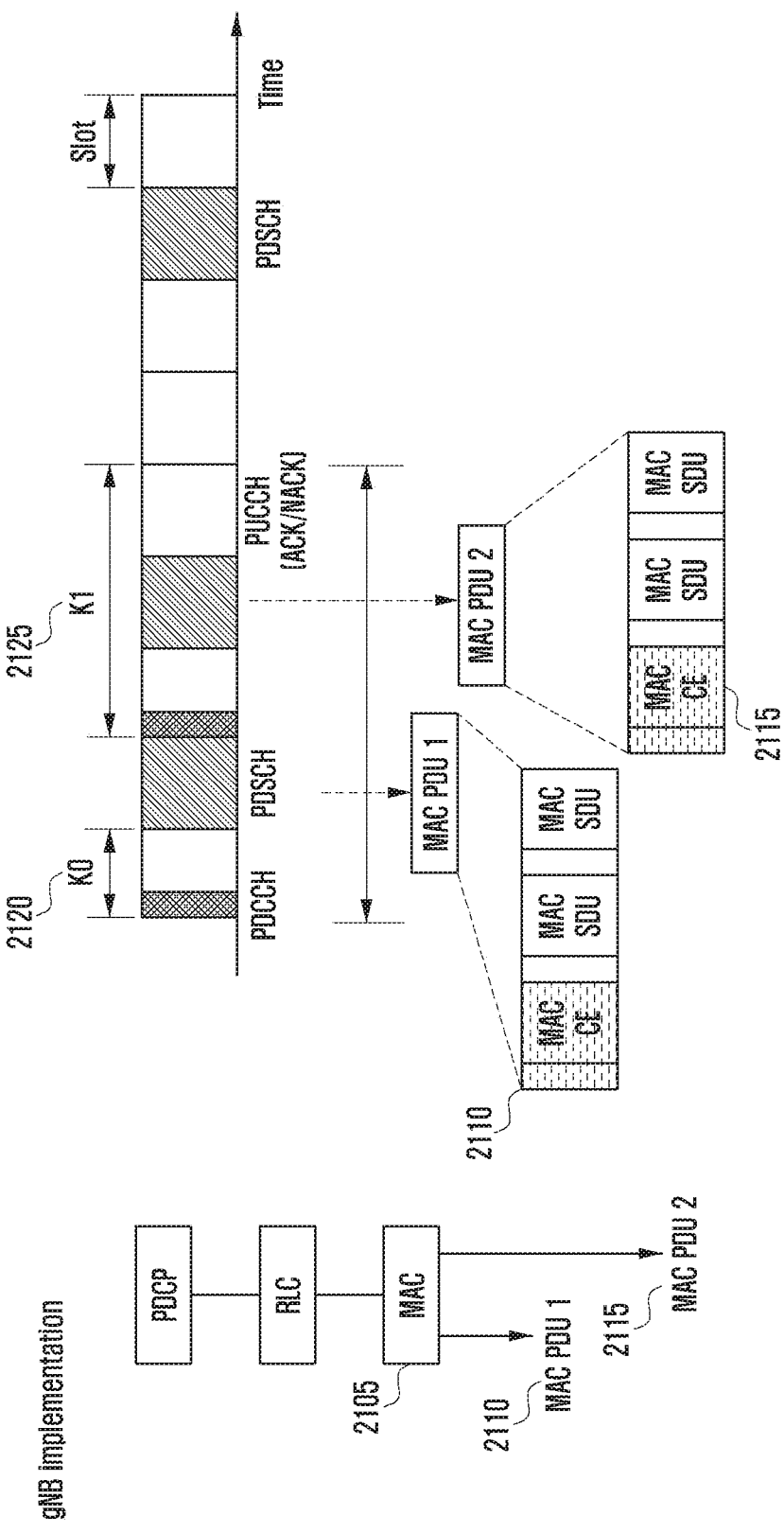
FIG. 21 is a diagram illustrating a method in which a base station transmits MAC control information in duplicate according to an embodiment of the disclosure.

FIG. 21 is a diagram illustrating a method in which a base station transmits MAC control information in duplicate according to an embodiment of the disclosure.

It is possible to improve reliability of the MAC control information and to reduce a transmission delay through a method in which the base station transmits MAC control information in duplicate as shown in FIG. 21.

In a next-generation mobile communication system, a base station may indicate a time to receive downlink data and frequency transmission resources after K0 time units (e.g., slots) to a terminal using control information transmitted through the Physical Downlink Control Channel (PDCCH) (2120). Then, the base station may instruct the terminal to report ACK/NACK information K1 time units after the reception of downlink data (2125).

In the next-generation mobile communication system, the base station has a variety of MAC control information to be transmitted to the terminal through the downlink. In particular, since the next-generation mobile communication system supports a high-frequency band and supports use of a plurality of beams or a beam having a narrow width, beam-related configuration information may be configured as MAC control information. In addition, if retransmission or a transmission delay of the MAC control information occurs, the beam of the base station and the beam of the terminal may rapidly change with time, which may deteriorate radio links.

Accordingly, the disclosure proposes a method in which the base station transmits only several bytes of MAC control information in duplicate such that the terminal is able to receive MAC control information in a short time.

If it is necessary to transmit MAC control information to the terminal, the base station may insert MAC control information in front of the MAC PDU (2105), and may transmit the same to the terminal (2110). If another MAC PDU is required to be transmitted to the terminal, the base station may insert duplicate MAC control information, which is obtained by duplicating the MAC control information, in front of the MAC PDU, and may transmit the same to the terminal in duplicate (2115), thereby improving reliability of the MAC control information and reducing a transmission delay.

In the next-generation mobile communication system, the base station transmits downlink data to one terminal, and then receives ACK/NACK information about the transmitted downlink data (K0+K1) hours after transmitting the downlink data. The base station may identify the ACK/NACK information about the transmitted downlink data, and may retransmit the downlink data (MAC PDUs) to the terminal.

Therefore, in the case where the MAC entity of the base station transmits another piece of downlink data to one terminal within a (K0+K1) time after transmitting downlink data including MAC control information to the terminal, the MAC entity may transmit the MAC control information in duplicate. That is, in the case where the base station transmits another piece of data to the terminal before identifying ACK/NACK information about the transmitted downlink data, the base station may transmit the MAC control information in duplicate.

If the terminal receives the duplicated MAC control information, the terminal may process and read the duplicated MAC control information without any problem due to the duplication transmission. Therefore, although initially transmitted downlink data is lost or transmission thereof fails, the subsequent downlink data including duplicated MAC control information may be successfully received, thereby improving reliability of the MAC control information and reducing a transmission delay.

Figure 22:
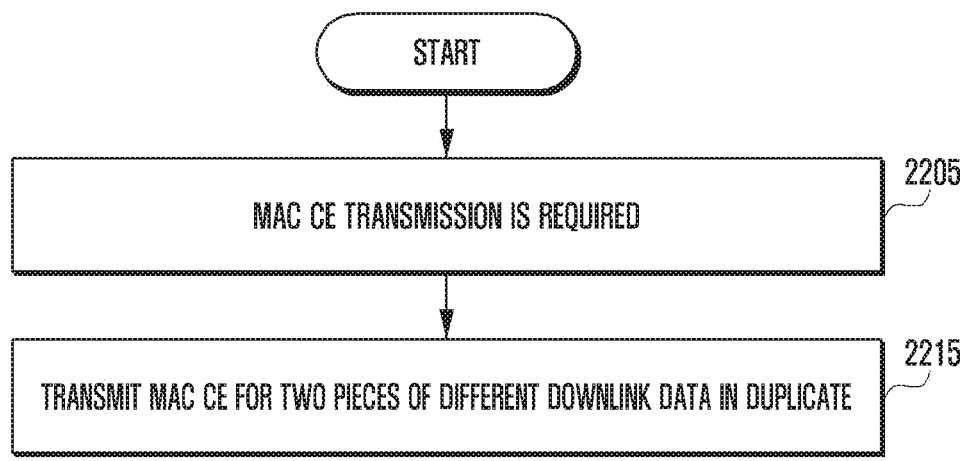
FIG. 22 is a flowchart illustrating a method in which a base station transmits MAC control information in duplicate according to an embodiment of the disclosure.

FIG. 22 is a flowchart illustrating a method in which a base station transmits MAC control information in duplicate according to an embodiment of the disclosure.

Referring to FIG. 22, the base station may determine whether or not a MAC CE is required to be transmitted (2205).

If the MAC CE is required to be transmitted, the base station may transmit the MAC CE in duplicate for two different pieces of downlink data (2215).

That is, the base station may insert MAC control information into data to thus transmit the same to terminal, and may duplicate the MAC control information to thus transmit the same in duplicate with another piece of data at a different time, thereby improving reliability of the MAC control information and reducing a transmission delay.

In addition, in the case where the base station transmits another piece of data within a predetermined time (before identifying ACK/NACK information about the transmitted data), the base station may transmit the MAC control information in duplicate.

Accordingly, the terminal may receive the data including the MAC CE, and may receive another piece of data that is transmitted with the duplicated MAC CE, thereby processing the duplicated MAC control information.

Figure 23:
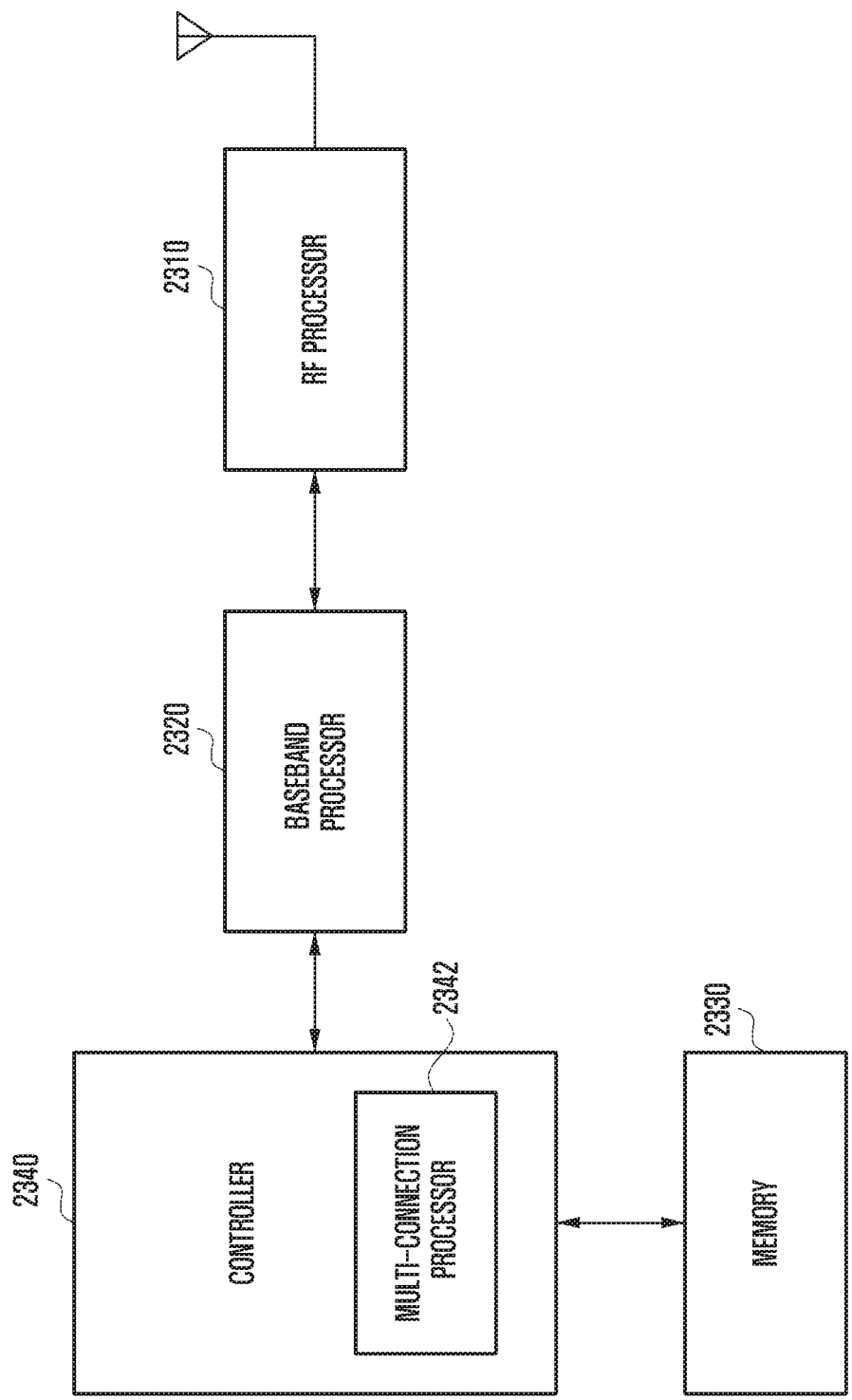
FIG. 23 illustrates the structure of a terminal according to an embodiment of the disclosure.

FIG. 23 illustrates the structure of a terminal according to an embodiment of the disclosure.

Referring to FIG. 23, the terminal includes a radio frequency (RF) processor 2310, a baseband processor 2320, a memory 2330, and a controller 2340 (e.g., at least one processor). The controller 2340 may include one or more multi-connection processors 2342.

The RF processor 2310 performs a function of transmitting and receiving a signal through a wireless channel by means of band conversion and amplification of a signal. That is, the RF processor 2310 up-converts a baseband signal provided from the baseband processor 2320 to an RF band signal to thus transmit the same through an antenna, and down-converts an RF band signal received through the antenna to a baseband signal. For example, the RF processor 2310 may include a transmission filter, a reception filter, an amplifier, a mixer, an oscillator, a digital-to-analog converter (DAC), an analog-to-digital converter (ADC), and the like. Although only one antenna is shown in the drawing, the terminal may have a plurality of antennas. In addition, the RF processor 2310 may include a plurality of RF chains. Further, the RF processor 2310 may perform beamforming. To perform beamforming, the RF processor 2310 may adjust the phases and magnitudes of signals transmitted and received through a plurality of antennas or antenna elements. In addition, the RF processor may perform multiple-input multiple-output (MIMO), and may receive multiple layers when performing the MIMO operation. The RF processor 2310 may perform reception beam sweeping by appropriately configuring a plurality of antennas or antenna elements under the control of the controller, or may adjust the direction of the reception beam and a beam width thereof such that the reception beam is coordinated with the transmission beam The baseband processor 2320 performs a function of conversion between a baseband signal and a bit string according to the physical layer specification of the system. For example, in the case of data transmission, the baseband processor 2320 encodes and modulates transmission bit strings, thereby generating complex symbols. In addition, upon receiving data, the baseband processor 2320 demodulates and decodes a baseband signal provided from the RF processor 2310 to thus recover reception bit strings. For example, in the case where an OFDM scheme is applied, when transmitting data, the baseband processor 2320 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 2320 divides the baseband signal provided from the RF processor 2310 into OFDM symbol units, restores the signals mapped with the subcarriers through a fast Fourier transform (FFT) operation, and then restores reception bit strings through demodulation and decoding.

The baseband processor 2320 and the RF processor 2310 transmit and receive signals as described above. Accordingly, the baseband processor 2320 or the RF processor 2310 may be referred to as a "transmitter", a "receiver", a "transceiver", or a "communication unit". Further, at least one of the baseband processor 2320 and the RF processor 2310 may include a plurality of communication modules to support a plurality of different wireless access technologies. In addition, at least one of the baseband processor 2320 and the RF processor 2310 may include different communication modules for processing signals of different frequency bands. For example, the different wireless access technologies may include an LTE network, an NR network, and the like. In addition, the different frequency bands may include super high frequency (SHF) (e.g., 2.2 GHz or 2 GHz) band and a millimeter wave (e.g., 60 GHz) band.

The memory 2330 stores data such as basic programs, application programs, and configuration information for the operation of the terminal. The memory 2330 provides stored data in response to a request from the controller 2340.

The controller 2340 controls the overall operation of the terminal. For example, the controller 2340 transmits and receives signals through the baseband processor 2320 and the RF processor 2310. In addition, the controller 2340 records and reads data in and from the memory 2330. To this end, the controller 2340 may include at least one processor. For example, the controller 2340 may include a communication processor (CP) for controlling communication and an application processor (AP) for controlling upper layers such as application programs.

Figure 24:
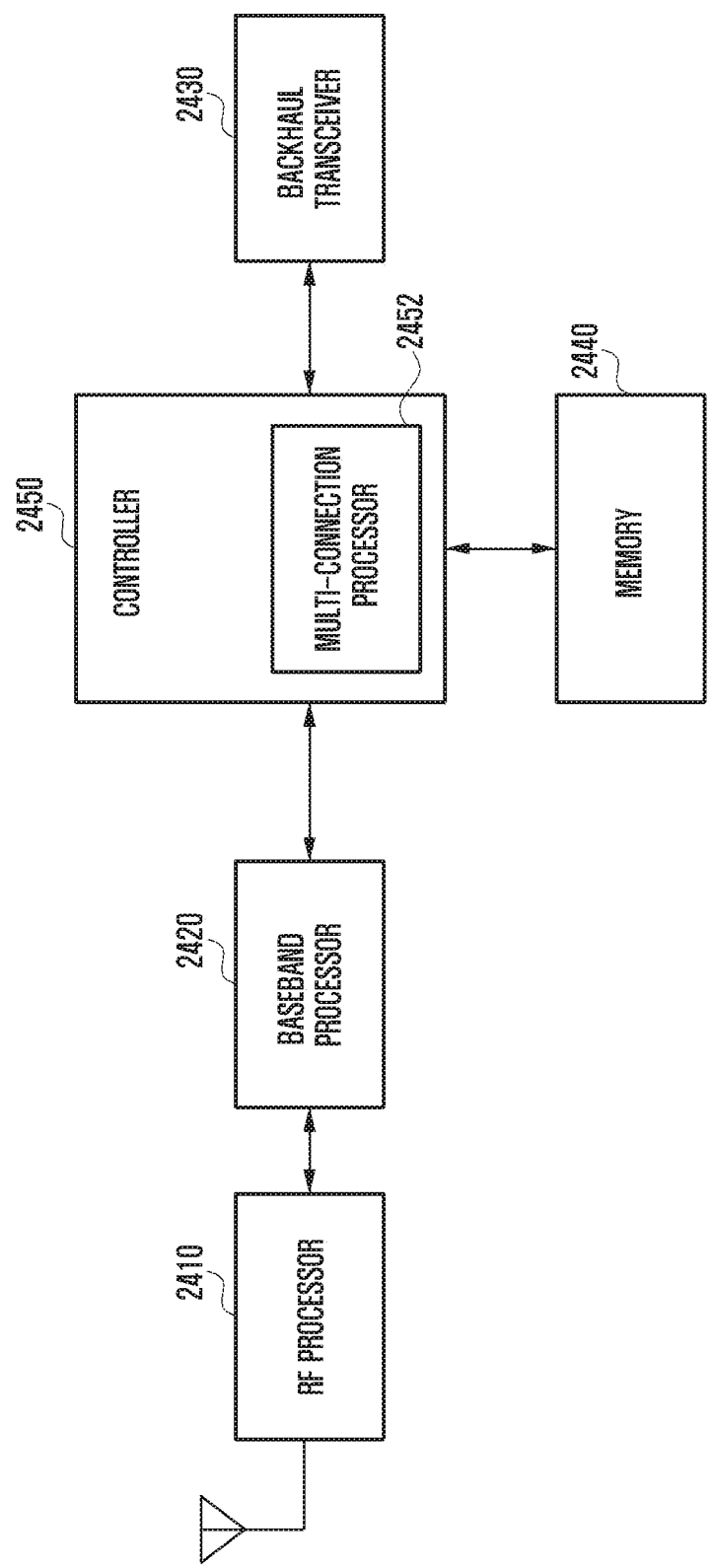
FIG. 24 illustrates a block diagram of a total radiated power (TRP) in a wireless communication system according to an embodiment of the disclosure.

FIG. 24 illustrates a block diagram of a TRP in a wireless communication system according to an embodiment of the disclosure.

As shown in the drawing above, the base station includes an RF processor 2410, a baseband processor 2420, a backhaul communication unit (or a backhaul transceiver) 2430, a memory 2440, and a controller 2450 (e.g., at least one processor). The controller 2450 may include one or more multi-connection processors 2452.

The RF processor 2410 performs a function of transmitting and receiving a signal through a wireless channel by means of band conversion and amplification of a signal. That is, the RF processor 2410 up-converts a baseband signal provided from the baseband processor 2420 to an RF band signal to thus transmit the same through an antenna and down-converts an RF band signal received through the antenna to a baseband signal. For example, the RF processor 2410 may include a transmission filter, a reception filter, an amplifier, a mixer, an oscillator, a DAC, an ADC, and the like. Although only one antenna is shown in the drawing, the base station may have a plurality of antennas. In addition, the RF processor 2410 may include a plurality of RF chains. Further, the RF processor 2410 may perform beamforming. To perform beamforming, the RF processor 2410 may adjust the phases and magnitudes of signals transmitted and received through a plurality of antennas or antenna elements. The RF processor may perform a downlink MIMO operation by transmitting one or more layers.

The baseband processor 2420 performs a function of conversion between a baseband signal and a bit string according to the physical layer specification of a first wireless access technique. For example, in the case of data transmission, the baseband processor 2420 encodes and modulates transmission bit strings, thereby generating complex symbols. In addition, upon receiving data, the baseband processor 2420 demodulates and decodes a baseband signal provided from the RF processor 2410 to thus recover reception bit strings. For example, in the case where an OFDM scheme is applied, when transmitting data, the baseband processor 2420 generates complex symbols by encoding and modulating transmission bit strings, maps the complex symbols with subcarriers, and then configures OFDM symbols through an IFFT operation and CP insertion. In addition, when receiving data, the baseband processor 2420 divides the baseband signal provided from the RF processor 2410 into OFDM symbol units, restores the signals mapped with the subcarriers through an FFT operation, and then restores reception bit strings through demodulation and decoding. The baseband processor 2420 and the RF processor 2410 transmit and receive signals as described above. Accordingly, the baseband processor 2420 or the RF processor 2410 may be referred to as a "transmitter", a "receiver", a "transceiver", a "communication unit", or a "wireless communication unit".

The transceiver 2430 provides an interface to perform communication with other nodes in a network.

The memory 2440 stores data such as basic programs, application programs, and configuration information for the operation of the primary base station. In particular, the memory 2440 may store information about bearers allocated to a connected terminal, a measurement result reported from a connected terminal, and the like. In addition, the memory 2440 may store information that is a criterion for determining whether multiple connections are provided to the terminal or are released. In addition, the memory 2440 provides stored data in response to a request from the controller 2450.

The controller 2450 controls the overall operation of the primary base station. For example, the controller 2450 transmits and receives signals through the baseband processor 2420 and the RF processor 2410 or through the backhaul transceiver 2430. In addition, the controller 2450 records and reads data in and from the memory 2440. To this end, the controller 2450 may include at least one processor.

Meanwhile, the sequence of the description in the drawings illustrating the method of the disclosure does not necessarily correspond to the sequence of execution, and the sequence may be varied or may be executed in parallel.

In addition, the drawings illustrating the method of the disclosure may exclude some elements, or may include only some elements without departing from the scope of the disclosure.

Further, the method of the disclosure may be carried out by combinations of all or some of the content included in the respective embodiments without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, a radio resource control (RRC) message including configuration information, the configuration information including information associated with a packet duplication and information on at least two logical channels;
    duplicating uplink packets in case that the packet duplication is activated;
    transmitting, to the base station, the duplicated uplink packets on a first logical channel and a second logical channel based on the information on the at least two logical channels, the first logical channel and the second logical channel being included in the at least two logical channels;
    receiving, from the base station, a first downlink packet on the first logical channel; and receiving, from the base station, a second downlink packet on the second logical channel, wherein the first downlink packet is different from the second downlink packet, wherein the uplink packets are pre-processed before receiving an uplink grant including resource allocation information, and wherein radio link control (RLC) sequences associated with the uplink packets are allocated to the uplink packets after receiving the uplink grant.

2. The method of claim 1, wherein the first downlink packet is received on the first logical channel and the second downlink packet is received on the second logical channel regardless of activation of the packet duplication.

3. The method of claim 1, wherein the first logical channel corresponds to a first RLC entity and the second logical channel corresponds to a second RLC entity.

4. The method of claim 1, wherein transmitting the duplicated uplink packets further comprises discarding the uplink duplicated packets in case that a successful delivery of one of the duplicated uplink packets is confirmed.

5. The method of claim 1,
wherein an initial state of the packet duplication is activated based on the information associated with the packet duplication, and
wherein the packet duplication is activated based on media access control (MAC) information.

6. The method of claim 1, wherein the information on the at least two logical channels includes at least two logical channel identities associated with a packet data convergence protocol (PDCP) entity.

7. A terminal in a communication system, the terminal comprising:
a transceiver; and
at least one processor coupled with the transceiver and configured to:
receive, from a base station, a radio resource control (RRC) message including configuration information, the configuration information including information associated with a packet duplication and information on at least two logical channels,
duplicate uplink packets in case that the packet duplication is activated,
transmit, to the base station, the duplicated uplink packets on a first logical channel and a second logical channel based on the information on the at least two logical channels, the first logical channel and the second logical channel being included in the at least two logical channels,
receive, from the base station, a first downlink packet on the first logical channel, and
receive, from the base station, a second downlink packet on the second logical channel,
wherein the first downlink packet is different from the second downlink packet,
wherein the uplink packets are pre-processed before receiving an uplink grant including resource allocation information, and
wherein radio link control (RLC) sequences associated with the uplink packets are allocated to the uplink packets after receiving the uplink grant.

8. The terminal of claim 7, wherein the first downlink packet is received on the first logical channel and the second downlink packet is received on the second logical channel regardless of activation of the packet duplication.

9. The terminal of claim 7, wherein the first logical channel corresponds to a first RLC entity and the second logical channel corresponds to a second RLC entity.

10. The terminal of claim 7, wherein the at least one processor is further configured to discard the uplink duplicated packets in case that a successful delivery of one of the duplicated uplink packets is confirmed.

11. The terminal of claim 7,
wherein an initial state of the packet duplication is activated based on the information associated with the packet duplication, and
wherein the packet duplication is activated based on media access control (MAC) information.

12. The terminal of claim 7, wherein the information on the at least two logical channels includes at least two logical channel identities associated with a packet data convergence protocol (PDCP) entity.

* * * * *